(12) United States Patent
Wang et al.

(10) Patent No.: US 10,813,059 B2
(45) Date of Patent: Oct. 20, 2020

(54) POWER CONTROL METHOD AND APPARATUS, TERMINAL, AND NETWORK DEVICE

(71) Applicant: Huawei Technologies Co., Ltd., Shenzhen, Guangdong, P.R. (CN)

(72) Inventors: Hong Wang, Beijing (CN); Wei Quan, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/272,867

(22) Filed: Feb. 11, 2019

(65) Prior Publication Data

US 2019/0174429 A1  Jun. 6, 2019

Related U.S. Application Data

(63) Continuation of application No. PCT/CN2016/095056, filed on Aug. 12, 2016.

(51) Int. Cl.
*H04W 52/32* (2009.01)
*H04W 52/38* (2009.01)
*H04W 4/70* (2018.01)
*H04W 52/24* (2009.01)
(Continued)

(52) U.S. Cl.
CPC ............ *H04W 52/32* (2013.01); *H04W 4/70* (2018.02); *H04W 52/242* (2013.01);
(Continued)

(58) Field of Classification Search
CPC ... H04L 5/0007; H04L 5/0048; H04L 5/0083; H04L 27/2605; H04L 27/2613;
(Continued)

(56) References Cited

U.S. PATENT DOCUMENTS

2012/0163252 A1  6/2012  Ahn et al.
2014/0274196 A1  9/2014  Dai et al.
(Continued)

FOREIGN PATENT DOCUMENTS

CN    102404837 A    4/2012
CN    103139889 A    6/2013
(Continued)

OTHER PUBLICATIONS

Qualcomm Incorporated et al., "New SI: Further Enhancements LTE Device to Device, UE to Network Relays for Wearables," RP-160677, 3GPP TSG RAN Meeting #71, Gothenburg, Sweden, Mar. 7-10, 2016, 7 pages.

*Primary Examiner* — Ronald B Abelson
(74) *Attorney, Agent, or Firm* — Slater Matsil, LLP

(57) ABSTRACT

A power control method includes: obtaining, by a first terminal, power control information, where the power control information is information used to control a transmit power used by the first terminal when the first terminal communicates with a second terminal; determining a target transmit power based on the power control information; and sending first data to the second terminal based on the target transmit power. A first communication link is established between the first terminal and the second terminal. In the present disclosure, the following prior-art problem is resolved: In a relay or D2D communication scenario, a base station does not configure, for a specific terminal, a transmit power used by the terminal during D2D communication. Therefore, transmit powers used by different terminals during D2D communication are indicated to the different terminals, and a power control effect is improved.

5 Claims, 11 Drawing Sheets

(51) Int. Cl.
*H04W 52/54* (2009.01)
*H04W 72/04* (2009.01)

(52) U.S. Cl.
CPC ....... *H04W 52/243* (2013.01); *H04W 52/383* (2013.01); *H04W 52/54* (2013.01); *H04W 72/0473* (2013.01); *H04W 52/245* (2013.01); *H04W 52/386* (2013.01)

(58) Field of Classification Search
CPC .... H04L 27/2656; H04W 52/32; H04W 4/70; H04W 52/242; H04W 52/243; H04W 52/383; H04W 52/54; H04W 72/0473
See application file for complete search history.

(56) References Cited

U.S. PATENT DOCUMENTS

2015/0139111 A1* 5/2015 Fodor ................... H04W 76/02
2015/0208383 A1* 7/2015 Fujishiro ............... H04W 72/04
2016/0037530 A1 2/2016 Peng et al.
2017/0048807 A1 2/2017 Wang
2017/0135048 A1 5/2017 Cao
2017/0318592 A1 11/2017 Chu et al.
2019/0089451 A1* 3/2019 Seo ........................ H04B 7/155

FOREIGN PATENT DOCUMENTS

| | | |
|---|---|---|
| CN | 104105185 A | 10/2014 |
| CN | 104509180 A | 4/2015 |
| CN | 105307256 A | 2/2016 |
| EP | 2768262 A1 | 8/2014 |
| EP | 3163951 A1 | 5/2017 |
| WO | 2006064411 A2 | 6/2006 |
| WO | 2015094215 A1 | 6/2015 |
| WO | 2015119552 A1 | 8/2015 |
| WO | 2016015204 A1 | 2/2016 |
| WO | 2016054933 A1 | 4/2016 |

* cited by examiner

POWER CONTROL METHOD AND APPARATUS, TERMINAL, AND NETWORK DEVICE

CROSS-REFERENCE TO RELATED APPLICATIONS

This application is a continuation of International Application No. PCT/CN2016/095056 filed on Aug. 12, 2016, the disclosure of which is hereby incorporated by reference in its entirety.

TECHNICAL FIELD

The present application relates to the field of wireless communications technologies, and in particular, to a power control method and apparatus, a terminal, and a network device.

BACKGROUND

A device to device (D2D) communications technology is a technology for direct communication between terminals. Different from a cellular communications technology, data exchanged between terminals does not need to be transmitted by using a base station, but is directly transmitted through an air interface between the terminals, to reduce dependence of the terminals on a network, and reduce a network forwarding delay and network load to some extent.

To expand network coverage, a network service can be provided for a terminal outside network coverage of the base station based on the D2D technology. As shown in FIG. 1A, a base station 11 and a relay terminal 12 communicate with each other by using a Uu interface, and a D2D communication link is established between the relay terminal 12 and a remote terminal 13, for example, a D2D communication link established by using a PC5 interface. The remote terminal 13 may fall outside network coverage of the base station 11, and the remote terminal 13 uses the relay terminal 12 to forward data of the remote terminal 13, to implement communication between the remote terminal 13 and the base station 11. In addition, a relay communication scenario may be further applied to the following scenario: As shown in FIG. 1B, the remote terminal 13 falls within the network coverage of the base station 11. In this case, the remote terminal 13 communicates with the base station 11 in a relay communication manner, to reduce power consumption of the remote terminal 13.

In the prior art, the base station may configure a D2D communication resource for a terminal (for example, the relay terminal 12 and the remote terminal 13 in FIG. 1 and FIG. 2) that performs D2D communication. The D2D communication resource includes transmit power control information, to indicate a transmit power used by the terminal to send D2D data to a peer. In the prior art, a terminal determines, in the following manner, a transmit power used during D2D communication: The base station broadcasts several resource pools to a terminal in a cell, where each resource pool includes several resources, and each resource pool is corresponding to one transmit power; and the terminal randomly selects, from the several resource pools, one resource pool to send D2D data.

Because terminals in a same cell may send D2D data by using a same transmit power, the base station does not configure, for a specific terminal, a transmit power used by the terminal during D2D communication, and a power control purpose cannot be better implemented.

SUMMARY

To resolve the following prior-art problem: In a relay or D2D communication scenario, a base station does not configure, for a specific terminal, a transmit power used by the terminal during D2D communication, embodiments of the present disclosure provide a power control method and apparatus, a terminal, and a network device.

In an aspect, an embodiment of the present disclosure provides a power control method. The method includes: obtaining, by a first terminal, power control information; determining, by the first terminal, a target transmit power based on the power control information; and sending, by the first terminal, first data to a second terminal based on the target transmit power.

In a possible design, the obtaining, by a first terminal, power control information includes: receiving, by the first terminal, the power control information sent by the second terminal. In another possible design, the obtaining, by a first terminal, power control information includes: receiving, by the first terminal, the power control information sent by a network device.

In another aspect, an embodiment of the present disclosure provides a power control method. The method includes: determining, by a network device, power control information; and sending, by the network device, the power control information to a first terminal.

In a possible design, the determining, by a network device, power control information includes: when the network device receives a receive power value of a second terminal sent by the second terminal, determining, by the network device, the power control information based on the receive power value of the second terminal. In another possible design, the determining, by a network device, power control information includes: when an actual receive power value of the network device is greater than a first threshold, determining, by the network device, the power control information based on the actual receive power value of the network device.

In still another aspect, an embodiment of the present disclosure provides a power control method. The method includes: determining, by a second terminal, power control information; sending, by the second terminal, the power control information to a first terminal; and receiving, by the second terminal, first data that is sent by the first terminal based on a target transmit power.

In a possible design, the determining, by a second terminal, power control information includes: when the second terminal receives a receive power value of a network device sent by the network device, determining, by the second terminal, the power control information based on the receive power value of the network device. In another possible design, when an actual receive power value of the second terminal is greater than a second threshold or less than a third threshold, the second terminal determines the power control information based on the actual receive power value of the second terminal.

In the embodiments of the present disclosure, the power control information is information used to control a transmit power used by the first terminal when the first terminal communicates with the second terminal, and a first communication link is established between the first terminal and the second terminal.

In the technical solutions provided in the embodiments of the present disclosure, because the power control information obtained by the first terminal is the information used to control the transmit power used by the first terminal when the first terminal communicates with the second terminal, the following prior-art problem is resolved: In a relay or D2D communication scenario, a base station does not configure, for a specific terminal, a transmit power used by the terminal during D2D communication. Therefore, transmit powers used by different terminals during D2D communication are indicated to the different terminals, and a power control effect is improved.

In a possible design, the power control information includes the transmit power used by the first terminal when the first terminal communicates with the second terminal, and the target transmit power is the used transmit power, where the used transmit power is determined by the second terminal, or the used transmit power is determined by the network device based on a receive power value, and the receive power value is a power value of a signal that is sent by the first terminal on the first communication link and that is received by the second terminal or the network device.

In another possible design, the power control information includes a threshold of the transmit power used by the first terminal when the first terminal communicates with the second terminal, and the target transmit power is less than or equal to the threshold.

In another possible design, the power control information includes an adjustment value of the transmit power used by the first terminal when the first terminal communicates with the second terminal, and the target transmit power is a power value determined based on a current transmit power and the adjustment value.

In another possible design, the power control information includes a receive power value, and the receive power value is a power value of a signal that is sent by the first terminal on the first communication link and that is received by the second terminal or the network device.

In another possible design, the power control information includes a transmit power value, and the transmit power value is a power value that is used by the second terminal to send a signal to the first terminal on the first communication link.

The receive power value is an actual receive power value, and the actual receive power value is a power value of a signal that is sent by the first terminal on the first communication link and that is actually received by the second terminal or the network device. Alternatively, the receive power value is an expected receive power value, and the expected receive power value is a power value of a signal that is sent by the first terminal on the first communication link and that the second terminal or the network device expects to receive.

In some optional embodiments, the target transmit power used by the first terminal during D2D communication is determined based on some reference information (for example, the receive power value, the threshold of the transmit power, the adjustment value of the transmit power, or the transmit power value that is described above). This helps improve accuracy of determining a transmit power used by a terminal during D2D communication.

In yet another aspect, an embodiment of the present disclosure provides a terminal. The terminal has a function of implementing behavior of the first terminal or the second terminal in the foregoing method example. The function may be implemented by hardware, or may be implemented by executing corresponding software by hardware. The hardware or software includes one or more modules corresponding to the function.

In a possible design, the terminal includes a processor, a receiver, and a transmitter. The processor is configured to support the terminal in performing a corresponding function in the foregoing method. The receiver and the transmitter are configured to support communication between the terminal and a network device. Further, the terminal may further include a memory. The memory is configured to be coupled to the processor, and the memory stores a program instruction and data that are necessary to the terminal.

In yet another aspect, an embodiment of the present disclosure provides a network device. The network device has a function of implementing behavior of the network device in the foregoing method example. The function may be implemented by hardware, or may be implemented by executing corresponding software by hardware. The hardware or software includes one or more modules corresponding to the function.

In a possible design, a structure of the network device includes a processor, a transmitter, and a receiver. The processor is configured to support the network device in performing a corresponding function in the foregoing method. The transmitter and the receiver are configured to support communication between the network device and a terminal. Further, the network device may further include a memory. The memory is configured to be coupled to the processor, and the memory stores a program instruction and data that are necessary to the network device.

In yet another aspect, an embodiment of the present disclosure provides a power control system. The system includes the network device, the first terminal, and the second terminal in the foregoing aspects.

In yet another aspect, an embodiment of the present disclosure provides a computer storage medium, configured to store a computer software instruction used by the foregoing terminal, where the computer software instruction includes a program designed for performing the foregoing aspect.

In yet another aspect, an embodiment of the present disclosure provides a computer storage medium, configured to store a computer software instruction used by the foregoing network device, where the computer software instruction includes a program designed for performing the foregoing aspect.

Compared with the prior art, in the technical solutions provided in the embodiments of the present disclosure, because the power control information obtained by the first terminal is the information used to control the transmit power used by the first terminal when the first terminal communicates with the second terminal (that is, the power control information obtained by the first terminal is used to control only the first terminal, but is not used to control another terminal), the following prior-art problem is resolved: In a relay or D2D communication scenario, a base station does not configure, for a specific terminal, a transmit power used by the terminal during D2D communication. Therefore, transmit powers used by different terminals during D2D communication are indicated to the different terminals, and a power control effect is improved.

In some optional embodiments, the target transmit power used by the first terminal during D2D communication is determined based on some reference information (for example, the receive power value, the threshold of the transmit power, the adjustment value of the transmit power, or the transmit power value that is described above). This helps improve accuracy of determining a transmit power used by a terminal during D2D communication.

BRIEF DESCRIPTION OF THE DRAWINGS

To describe the technical solutions in the background and the embodiments of the present disclosure more clearly, the following briefly describes the accompanying drawings required for describing the background and the embodiments. Apparently, the accompanying drawings in the following description show merely some embodiments of the present disclosure, and a person of ordinary skill in the art may derive other drawings from these accompanying drawings without creative efforts.

DETAILED DESCRIPTION

To make the objectives, technical solutions, and advantages of the present disclosure clearer, the following further describes the implementations of the present disclosure in detail with reference to the accompanying drawings.

In this specification, "a plurality of" means two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

Figure 1A:
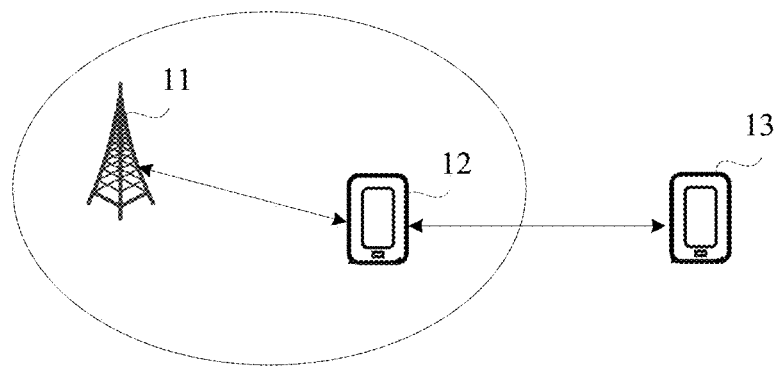
FIG. 1A is a schematic diagram of a communication scenario in the background.
Figure 1B:
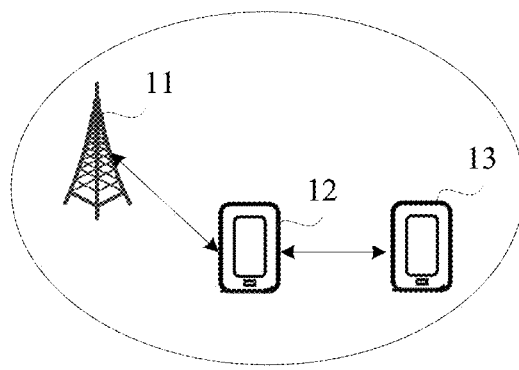
FIG. 1B is a schematic diagram of another communication scenario in the background.
Figure 2:
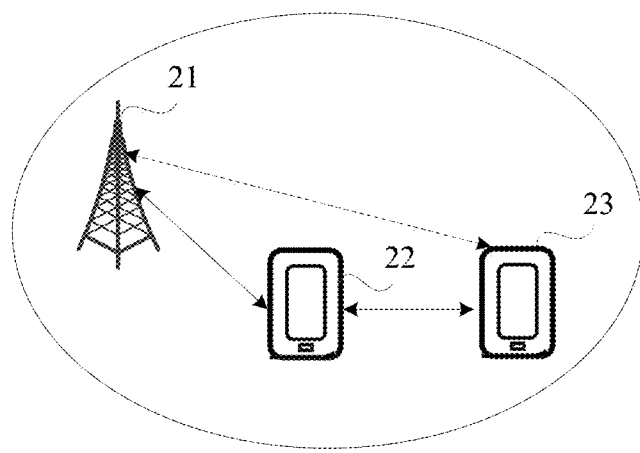
FIG. 2 is a schematic diagram of an implementation environment according to an embodiment of the present disclosure.

FIG. 2 is a schematic diagram of an implementation environment according to an embodiment of the present disclosure. The implementation environment includes a base station 21 and at least one terminal.

As shown in FIG. 2, there are usually a plurality of terminals, and the plurality of terminals are located in a cell managed by the base station 21. In this embodiment of the present disclosure, a relay terminal may be any terminal in the cell managed by the base station 21, and a remote terminal may be also any terminal in the cell managed by the base station 21. For example, as shown in FIG. 2, the relay terminal is represented by using a reference numeral 22 and the remote terminal is represented by using a reference numeral 23. An interaction procedure between the base station 21 and both the relay terminal 22 and the remote terminal 23 is only used as an example to describe this embodiment of the present disclosure. For an interaction procedure between the base station 21 and each of other terminals in the cell managed by the base station 21, refer to the interaction procedure between the base station 21 and both the relay terminal 22 and the remote terminal 23.

The base station 21 and the terminal (including the relay terminal 22, the remote terminal 23, and the like) communicate with each other by using an air interface technology, for example, may communicate with each other by using a cellular technology. The technical solutions described in this embodiment of the present disclosure may be applied to a Long Term Evolution (LTE) system or other wireless communications systems using various radio access technologies, for example, systems using access technologies such as Code Division Multiple Access (CDMA), Frequency Division Multiple Access (FDMA), Time Division Multiple Access (TDMA), orthogonal frequency division multiple access (OFDMA), and single carrier frequency division multiple access (SC-FDMA). In addition, the technical solutions may be also applied to a subsequent evolved system of the LTE system, for example, a 5th Generation (5G) system. For clarity, the LTE system is used only as an example herein for description. In the LTE system, an evolved universal terrestrial radio access network (E-UTRAN) is used as a radio access network, and an evolved packet core (EPC) is used as a core network. The base station 21 and any terminal in the cell managed by the base station 21 may communicate with each other by using a cellular communication link. The LTE system is used as an example. The base station 21 establishes a cellular communication link to the terminal by using a Uu interface. In addition, any terminal in the cell managed by the base station 21 may further communicate with the base station 21 in a relay communication manner. For example, as shown in FIG. 2, a D2D communication link is established between the remote terminal 23 and the relay terminal 22, and the remote terminal 23 communicates with the base station 21 by using the relay terminal 22. For example, the D2D communication link is established between the remote terminal 23 and the relay terminal 22 by using a PC5 interface.

In the embodiments of the present disclosure, when a first terminal is a remote terminal, a second terminal is a relay terminal; or when a first terminal is a relay terminal, a second terminal is a remote terminal. A first communication link is established between the relay terminal and the remote terminal. A second communication link may be established between a network device and the relay terminal. A second communication link may be or may not be established between the network device and the remote terminal. The first communication link is a communication link between terminals. The first communication link may be also referred to as a D2D communication link. The first communication link is used for D2D communication between the first terminal and the second terminal. Data is transmitted between the first terminal and the second terminal on the first communication link by using a D2D communications technology. The second communication link is a communication link between a terminal and the network device. For example, when the technical solutions provided in the embodiments of the present disclosure are applied to a cellular network, the second communication link may be also referred to as a cellular communication link, and data is transmitted between the terminal and the network device on the cellular communication link by using a cellular communications technology. A communication link is a physical or logical connection between two nodes in a network.

In the cellular communications technology, the terminal communicates with the network device by using an air interface (for example, a Uu interface). The terminal forwards data to a destination node in the network by using the network device, or the network device forwards, to the terminal, data from the network.

The D2D communications technology is a technology for direct communication between terminals. Different from the cellular communications technology, data of the terminal does not need to be transmitted by using the network device, but is directly transmitted through an air interface (for example, a PC5 interface) between the terminals. D2D communication reduces dependence on the network during communication between the terminals, and reduces a network forwarding delay and network load to some extent.

Currently, the D2D communications technology supports group communication (namely, one-to-many communication) and unicast communication (namely, one-to-one communication). The group communication means that one terminal may send D2D data to several terminals in a communication group. The unicast communication means that one terminal may send D2D data to another terminal.

The D2D communications technology may be applied to the cellular network. An example in which the D2D communications technology is applied to an LTE system is used. The network device is a base station, a cellular communication link is established between a terminal and the base station by using a Uu interface, and a D2D communication link is established between terminals by using a PC5 interface. The D2D communications technology may be further applied to another communications network, and this is not limited in this embodiment of the present disclosure. For example, the D2D communications technology may be further applied to a wireless local area network (WLAN). In this case, the network device is an access point (AP), a second communication link is established between a terminal and the AP based on an interface in a WLAN technology, and a first communication link is established between terminals based on an interface in the WLAN technology. In addition, in this embodiment of the present disclosure, a technology used during D2D communication between terminals is not limited either. For example, the terminals may perform D2D communication with each other based on the cellular communications technology (for example, an LTE technology), perform D2D communication with each other based on the WLAN technology, or perform D2D communication with each other based on a Bluetooth technology.

In the embodiments of the present disclosure, terms "network" and "system" are usually interchangeably used, but a person skilled in the art may understand meanings thereof. The terminal in the embodiments of the present disclosure may include a handheld device (for example, a mobile phone, an intelligent terminal, a multimedia device, or a streaming device) having a wireless communication function, an in-vehicle device, a wearable device, a computing device, another processing device connected to a wireless modem, or user equipment (UE), a mobile station (MS), and a terminal device, and the like in various forms. For ease of description, the devices mentioned above are collectively referred to as terminals.

The "network device" in the embodiments of the present disclosure may be a base station (BS), and the base station is an apparatus deployed in a radio access network to provide a wireless communication function for the terminal. The base station may include a macro base station, a micro base station, a relay station, an access point, and the like in various forms. In systems using different radio access technologies, names of devices having a base station function may be different. For example, in an LTE system, the device is referred to as an evolved NodeB (eNB or eNodeB); in a 3G communications system, the device is referred to as a Node B. With evolution of communications technologies, the name "base station" may change. In addition, in another possible case, the network device may be an AP, or another apparatus providing the wireless communication function for the terminal. For ease of description, in the embodiments of the present disclosure, the apparatuses providing the wireless communication function for the terminal are collectively referred to as network devices.

The following describes, by using several embodiments, the technical solutions provided in the present disclosure.

The following method embodiments may be applied to the implementation environment shown in FIG. 2. As shown in FIG. 2, the first communication link is established between the relay terminal 22 and the remote terminal 23. The second communication link may be established between the network device 21 and the relay terminal 22. The second communication link may be or may not be established between the network device 21 and the remote terminal 23. When the second communication link is established between the network device 21 and the remote terminal 23, data may be directly exchanged between the network device 21 and the remote terminal 23 by using the second communication link. When no second communication link is established between the network device 21 and the remote terminal 23, data is exchanged between the network device 21 and the remote terminal 23 by using the relay terminal 22. In the following method embodiments, when the first terminal is a remote terminal, the second terminal is a relay terminal; or when the first terminal is a relay terminal, the second terminal is a remote terminal.

Embodiment 1

Figure 3:
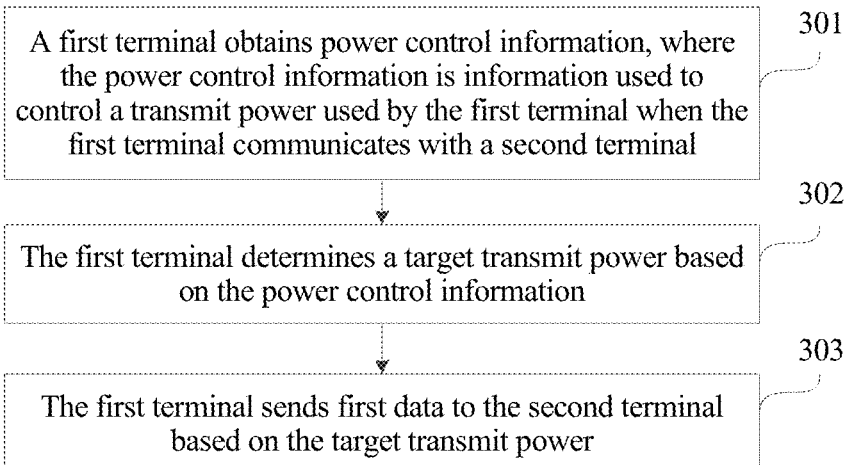
FIG. 3 is a flowchart of a power control method according to an embodiment of the present disclosure.

FIG. 3 is a flowchart of a power control method according to an embodiment of the present disclosure. The method may include the following several steps.

Step 301. A first terminal obtains power control information, where the power control information is information used to control a transmit power used by the first terminal when the first terminal communicates with a second terminal.

A first communication link is established between the first terminal and the second terminal.

The power control information includes the following several possible implementations:

1. The power control information includes the transmit power used by the first terminal when the first terminal communicates with the second terminal.

In an example, the used transmit power is determined by the second terminal. Optionally, the used transmit power is determined by the second terminal based on a receive power value, and the receive power value is a power value of a signal that is sent by the first terminal on the first communication link and that is received by the second terminal or a network device. In the foregoing optional manner, when determining the transmit power used by the first terminal, the second terminal uses the receive power value as reference information, and determines, based on the receive power value, the transmit power used by the first terminal. In another possible manner, the second terminal may directly configure the transmit power used by the first terminal, without using reference information.

In another example, the used transmit power is determined by a network device based on a receive power value, and the receive power value is a power value of a signal that is sent by the first terminal on the first communication link and that is received by the second terminal or the network device.

2. The power control information includes a threshold of the transmit power used by the first terminal when the first terminal communicates with the second terminal.

3. The power control information includes an adjustment value of the transmit power used by the first terminal when the first terminal communicates with the second terminal.

4. The power control information includes a receive power value, and the receive power value is a power value of a signal that is sent by the first terminal on the first communication link and that is received by the second terminal or a network device.

5. The power control information includes a transmit power value, and the transmit power value is a power value that is used by the second terminal to send a signal to the first terminal on the first communication link.

In an example, the receive power value is an actual receive power value, and the actual receive power value is a power value of a signal that is sent by the first terminal on the first communication link and that is actually received by the second terminal or the network device. In another example, the receive power value is an expected receive power value, and the expected receive power value is a power value of a signal that is sent by the first terminal on the first communication link and that the second terminal or the network device expects to receive.

In an example, the first terminal receives the power control information sent by the second terminal. In this case, the power control information may be determined by the second terminal, and the second terminal sends, to the first terminal, the power control information determined by the second terminal. Alternatively, the power control information may be determined by the network device, the network device sends, to the second terminal, the power control information determined by the network device, and the second terminal forwards the power control information to the first terminal.

In another example, the first terminal receives the power control information sent by the network device. In this case, the power control information is usually determined by the network device, and the network device sends, to the first terminal, the power control information determined by the network device. Certainly, a possibility that the second terminal determines the power control information is not excluded, the second terminal sends, to the network device, the power control information determined by the second terminal, and the network device forwards the power control information to the first terminal.

Step 302. The first terminal determines a target transmit power based on the power control information.

Corresponding to the first possible implementation, the target transmit power is the used transmit power.

Corresponding to the second possible implementation, the target transmit power is less than or equal to the threshold.

Corresponding to the third possible implementation, the target transmit power is a power value determined based on a current transmit power and the adjustment value.

Corresponding to the fourth possible implementation, the target transmit power is a power value determined based on the receive power value. In an example, when the receive power value is an expected receive power value of the second terminal, the target transmit power is a power value determined based on the expected receive power value of the second terminal and a path loss on the first communication link.

Corresponding to the fifth possible implementation, the target transmit power is the transmit power value, or the target transmit power is a power value determined based on the transmit power value and a preset offset value.

Step 303. The first terminal sends first data to the second terminal based on the target transmit power.

In conclusion, in the method provided in this embodiment, because the power control information obtained by the first terminal is the information used to control the transmit power used by the first terminal when the first terminal communicates with the second terminal, the following prior-art problem is resolved: In a relay or D2D communication scenario, a base station does not configure, for a specific terminal, a transmit power used by the terminal during D2D communication. Therefore, transmit powers used by different terminals during D2D communication are indicated to the different terminals, and a power control effect is improved.

In addition, in some optional embodiments, the target transmit power used by the first terminal during D2D communication is determined based on some reference information (for example, the receive power value, the threshold of the transmit power, the adjustment value of the transmit power, or the transmit power value that is described above). This helps improve accuracy of determining a transmit power used by a terminal during D2D communication.

Embodiment 2

Figure 4:
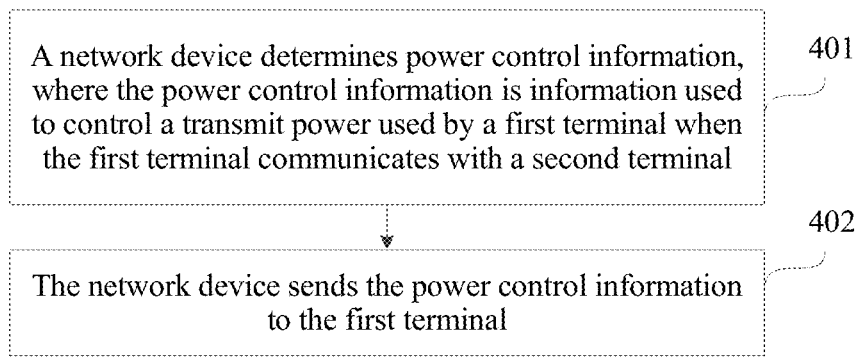
FIG. 4 is a flowchart of a power control method according to another embodiment of the present disclosure.

FIG. 4 is a flowchart of a power control method according to another embodiment of the present disclosure. The method may include the following several steps.

Step 401. A network device determines power control information, where the power control information is information used to control a transmit power used by a first terminal when the first terminal communicates with a second terminal.

A first communication link is established between the first terminal and the second terminal.

The power control information includes the following several possible implementations:

1. The power control information includes the transmit power used by the first terminal when the first terminal communicates with the second terminal.

The used transmit power is determined by the network device based on a receive power value, and the receive power value is a power value of a signal that is sent by the first terminal on the first communication link and that is received by the second terminal or the network device.

2. The power control information includes a threshold of the transmit power used by the first terminal when the first terminal communicates with the second terminal.

3. The power control information includes an adjustment value of the transmit power used by the first terminal when the first terminal communicates with the second terminal.

4. The power control information includes a receive power value, and the receive power value is a power value of a signal that is sent by the first terminal on the first communication link and that is received by the second terminal or the network device.

5. The power control information includes a transmit power value, and the transmit power value is a power value that is used by the second terminal to send a signal to the first terminal on the first communication link.

In an example, the receive power value is an actual receive power value, and the actual receive power value is a power value of a signal that is sent by the first terminal on the first communication link and that is actually received by the second terminal or the network device. In another example, the receive power value is an expected receive power value, and the expected receive power value is a power value of a signal that is sent by the first terminal on the first communication link and that the second terminal or the network device expects to receive.

In an example, when the network device receives a receive power value of the second terminal sent by the second terminal, the network device determines the power control information based on the receive power value of the second terminal. The receive power value of the second terminal is a power value of a signal that is sent by the first terminal on the first communication link and that is received by the second terminal.

In another example, when an actual receive power value of the network device is greater than a first threshold, the network device determines the power control information based on the actual receive power value of the network device. The actual receive power value of the network device is a power value of a signal that is sent by the first terminal on the first communication link and that is actually received by the network device.

Step 402. The network device sends the power control information to the first terminal.

After receiving the power control information, the first terminal determines a target transmit power based on the power control information, and then sends first data to the second terminal based on the target transmit power. For a manner in which the first terminal determines the target transmit power, refer to the descriptions of step 302 in the embodiment shown in FIG. 3. Details are not described herein again.

In conclusion, in the method provided in this embodiment, because the power control information obtained by the first terminal is the information used to control the transmit power used by the first terminal when the first terminal communicates with the second terminal, the following prior-art problem is resolved: In a relay or D2D communication scenario, a base station does not configure, for a specific terminal, a transmit power used by the terminal during D2D communication. Therefore, transmit powers used by different terminals during D2D communication are indicated to the different terminals, and a power control effect is improved.

In addition, in some optional embodiments, the target transmit power used by the first terminal during D2D communication is determined based on some reference information (for example, the receive power value, the threshold of the transmit power, the adjustment value of the transmit power, or the transmit power value that is described above). This helps improve accuracy of determining a transmit power used by a terminal during D2D communication.

Embodiment 3

Figure 5:
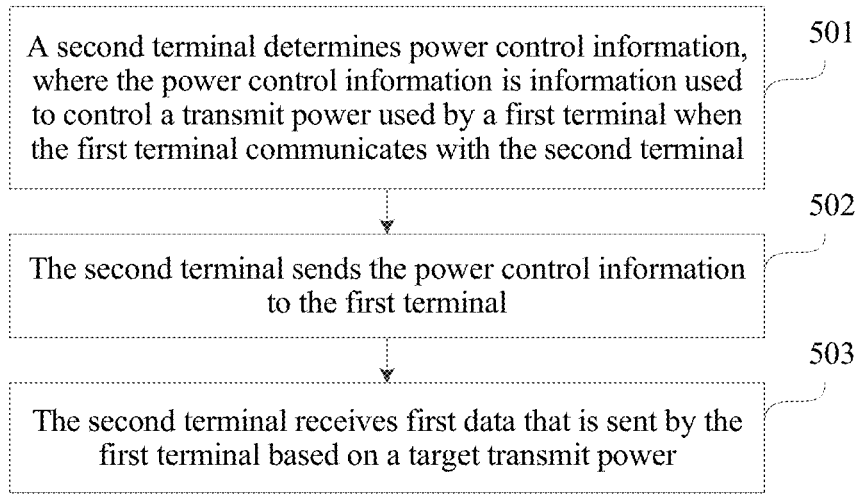
FIG. 5 is a flowchart of a power control method according to another embodiment of the present disclosure.

FIG. 5 is a flowchart of a power control method according to another embodiment of the present disclosure. The method may include the following several steps.

Step 501. A second terminal determines power control information, where the power control information is information used to control a transmit power used by a first terminal when the first terminal communicates with the second terminal.

A first communication link is established between the first terminal and the second terminal.

The power control information includes the following several possible implementations:

1. The power control information includes the transmit power used by the first terminal when the first terminal communicates with the second terminal.

Optionally, the used transmit power is determined by the second terminal based on a receive power value, and the receive power value is a power value of a signal that is sent by the first terminal on the first communication link and that is received by the second terminal or a network device. In the foregoing optional manner, when determining the transmit power used by the first terminal, the second terminal uses the receive power value as reference information, and determines, based on the receive power value, the transmit power used by the first terminal. In another possible manner, the second terminal may directly configure the transmit power used by the first terminal, without using reference information.

2. The power control information includes a threshold of the transmit power used by the first terminal when the first terminal communicates with the second terminal.

3. The power control information includes an adjustment value of the transmit power used by the first terminal when the first terminal communicates with the second terminal.

4. The power control information includes a receive power value, and the receive power value is a power value of a signal that is sent by the first terminal on the first communication link and that is received by the second terminal or a network device.

5. The power control information includes a transmit power value, and the transmit power value is a power value that is used by the second terminal to send a signal to the first terminal on the first communication link.

In an example, the receive power value is an actual receive power value, and the actual receive power value is a power value of a signal that is sent by the first terminal on the first communication link and that is actually received by the second terminal or the network device. In another example, the receive power value is an expected receive power value, and the expected receive power value is a power value of a signal that is sent by the first terminal on the first communication link and that the second terminal or the network device expects to receive.

In an example, when the second terminal receives a receive power value of a network device sent by the network device, the second terminal determines the power control information based on the receive power value of the network device. The receive power value of the network device is a power value of a signal that is sent by the first terminal on the first communication link and that is received by the network device.

In another example, when an actual receive power value of the second terminal is greater than a second threshold or less than a third threshold, the second terminal determines the power control information based on the actual receive power value of the second terminal. The actual receive power value of the second terminal is a power value of a signal that is sent by the first terminal on the first communication link and that is actually received by the second terminal.

Step 502. The second terminal sends the power control information to the first terminal.

After receiving the power control information, the first terminal determines a target transmit power based on the power control information, and then sends first data to the second terminal based on the target transmit power. For a manner in which the first terminal determines the target transmit power, refer to the descriptions of step 302 in the embodiment shown in FIG. 3. Details are not described herein again.

Step 503. The second terminal receives first data that is sent by the first terminal based on a target transmit power.

In conclusion, in the method provided in this embodiment, because the power control information obtained by the first terminal is the information used to control the transmit power used by the first terminal when the first terminal communicates with the second terminal, the following prior-art problem is resolved: In a relay or D2D communication scenario, a base station does not configure, for a specific terminal, a transmit power used by the terminal during D2D communication. Therefore, transmit powers used by different terminals during D2D communication are indicated to the different terminals, and a power control effect is improved.

In addition, in some optional embodiments, the target transmit power used by the first terminal during D2D communication is determined based on some reference information (for example, the receive power value, the threshold of the transmit power, the adjustment value of the transmit power, or the transmit power value that is described above). This helps improve accuracy of determining a transmit power used by a terminal during D2D communication.

The following embodiments shown in FIG. 6 to FIG. 9 are mainly described by using an example in which power control information is determined based on a receive power value. In the embodiment shown in FIG. 6, a network device determines the power control information based on a receive power value of a second terminal. In the embodiment shown in FIG. 7, the second terminal determines the power control information based on the receive power value of the second terminal. In the embodiment shown in FIG. 8, the second terminal determines the power control information based on a receive power value of the network device. In the embodiment shown in FIG. 9, the network device determines the power control information based on the receive power value of the network device.

Embodiment 4

Figure 6:
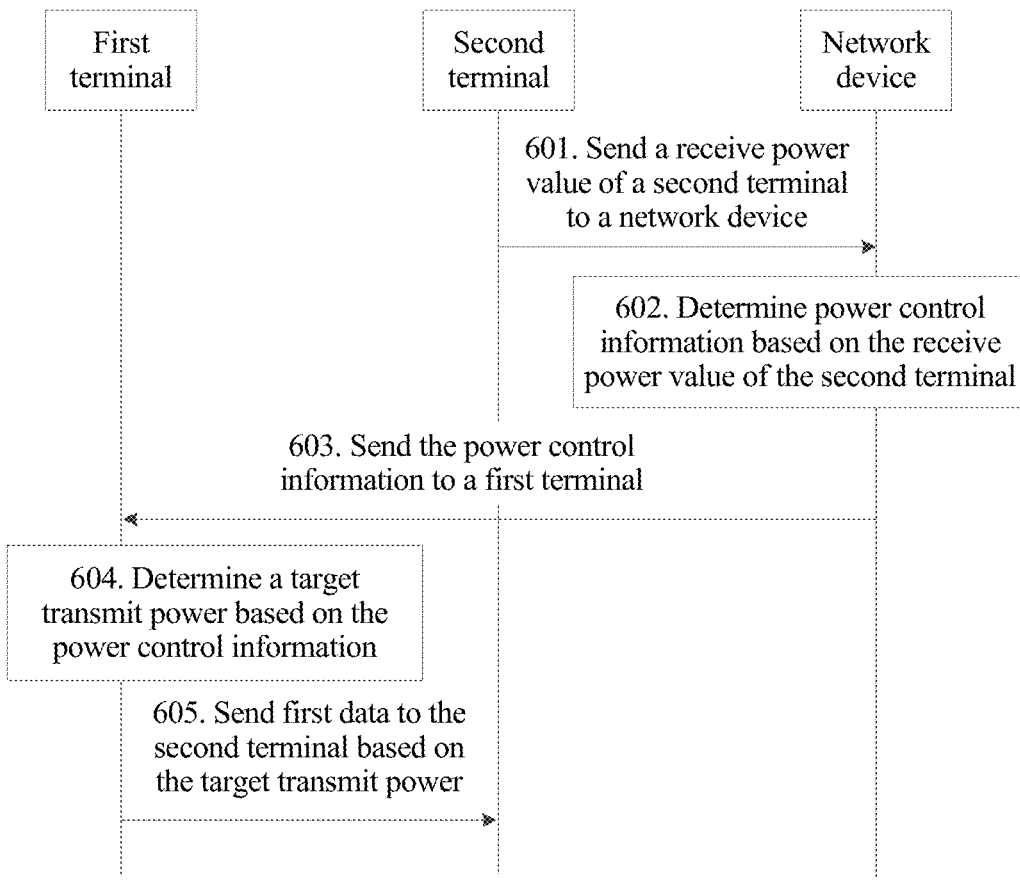
FIG. 6 is a flowchart of a power control method according to another embodiment of the present disclosure.

FIG. 6 is a flowchart of a power control method according to another embodiment of the present disclosure. The method may include the following several steps.

Step 601. A second terminal sends a receive power value of the second terminal to a network device.

The receive power value of the second terminal is a power value of a signal that is sent by a first terminal on a first communication link and that is received by the second terminal. To be specific, the receive power value of the second terminal is a power value of a D2D signal that is sent by the first terminal and that is received by the second terminal.

In an example, the receive power value of the second terminal is an actual receive power value of the second terminal. The actual receive power value of the second terminal is a power value of a signal that is sent by the first terminal on the first communication link and that is actually received by the second terminal. The first communication link (namely, a D2D communication link) is established between the first terminal and the second terminal. The second terminal measures the power value of the D2D signal sent by the first terminal, and uses the power value as the actual receive power value of the second terminal. The D2D signal is a signal transmitted by using the D2D communication link. For example, the D2D signal may be a reference signal in a discovery message, and that the second terminal measures a power value of the reference signal in the discovery message sent by the first terminal means measuring an SD-RSRP (sidelink discovery reference signal received power, which is a reference signal received power of the discovery message on the D2D communication link), and using the SD-RSRP as the actual receive power value of the second terminal. For another example, the D2D signal may be a reference signal in a synchronization message, and that the second terminal measures a power value of the reference signal in the synchronization message sent by the first terminal means measuring an S-RSRP (sidelink reference signal received power, which is a reference signal received power on the D2D communication link), and using the S-RSRP as the actual receive power value of the second terminal.

In another example, the receive power value of the second terminal is an expected receive power value of the second terminal. The expected receive power value of the second terminal is a power value of a signal that is sent by the first terminal on the first communication link and that the second terminal expects to receive. The expected receive power value of the second terminal is a power value that is determined by the second terminal based on a signal power required for decoding data (referred to as "D2D data" below) sent by the first terminal on the first communication link. When a transmit power that is used by the first terminal to send the D2D data is excessively high, although the second terminal can decode the D2D data, the second terminal does not need such a high receive power, and therefore the transmit power of the first terminal may be decreased. On the contrary, when a transmit power that is used by the first terminal to send the D2D data is excessively low, the second terminal cannot correctly decode the D2D data, and therefore the transmit power of the first terminal may be increased. Therefore, the expected receive power value of the second terminal is a power value that is determined by the second terminal, that can ensure that the D2D data sent by the first terminal is correctly decoded, and that is not excessively high.

Optionally, the second terminal measures the power value of the signal that is sent by the first terminal on the first communication link, and uses the power value as the actual receive power value of the second terminal. When the actual receive power value of the second terminal is greater than a second threshold or less than a third threshold, the second terminal sends the actual receive power value or the expected receive power value of the second terminal to the network device. For example, the second threshold may be greater than the third threshold. In a process in which the second terminal performs D2D communication with the first terminal, the second terminal performs signal measurement on the first terminal periodically or based on a configuration requirement, to obtain the actual receive power value of the second terminal. When the actual receive power value of the second terminal is greater than the second threshold, it indicates that the transmit power of the first terminal is excessively high. To reduce power consumption of the first terminal, in this embodiment, the second terminal performs the step of sending the actual receive power value or the expected receive power value of the second terminal to the network device, so that the network device controls the first terminal to decrease the transmit power. When the actual receive power value of the second terminal is less than the third threshold, it indicates that the transmit power of the first terminal is excessively low. To ensure that the D2D data sent by the first terminal is correctly decoded, in this embodiment, the second terminal performs the step of sending the actual receive power value and the expected receive power value of the second terminal to the network device, so that the network device controls the first terminal to increase the transmit power. In the foregoing manner, when the actual receive power value of the second terminal is greater than the second threshold or less than the third threshold, the second terminal sends the receive power value of the second terminal to the network device, so that the network device adjusts the transmit power of the first terminal based on a requirement of the second terminal.

In addition, when the first terminal is a remote terminal and the second terminal is a relay terminal, the second terminal sends the receive power value of the second terminal to the network device over a second communication link established between the second terminal and the network device. When the first terminal is a relay terminal and the second terminal is a remote terminal, if a second communication link is established between the second terminal and the network device (that is, the second terminal is in a connected mode, for example, an RRC_CONNECTED mode), the second terminal sends the receive power value of the second terminal to the network device over the second communication link established between the second terminal and the network device. If no second communication link is established between the second terminal and the network device (that is, the second terminal is in an idle mode, for example, an RRC_IDLE mode), the second terminal sends the receive power value of the second terminal to the first terminal over the first communication link established between the second terminal and the first terminal, and the first terminal forwards the receive power value of the second terminal to the network device over a second communication link established between the first terminal and the network device.

Correspondingly, the network device receives the receive power value of the second terminal.

Step 602. The network device determines power control information based on the receive power value of the second terminal.

Step 603. The network device sends the power control information to a first terminal.

In this embodiment, the power control information includes dedicated power control information, and the dedicated power control information is information used to control a transmit power used by the first terminal when the first terminal communicates with the second terminal. To be specific, the dedicated power control information received by the first terminal is used to control only the first terminal, but is not used to control another terminal. In this embodiment, the dedicated power control information is determined by the network device based on the receive power value of the second terminal.

In an example, the dedicated power control information includes the transmit power used by the first terminal when the first terminal communicates with the second terminal. In another example, the dedicated power control information includes a threshold of the transmit power used by the first terminal when the first terminal communicates with the second terminal. The threshold includes an upper limit of the transmit power of the first terminal. Optionally, the threshold further includes a lower limit of the transmit power of the first terminal. In still another example, the dedicated power control information includes the expected receive power value of the second terminal.

In addition, when the first terminal is a remote terminal and the second terminal is a relay terminal, if a second communication link is established between the first terminal and the network device (that is, the first terminal is in a connected mode, for example, an RRC_CONNECTED mode), the network device sends the power control information to the first terminal over the second communication link. If no second communication link is established between the first terminal and the network device (that is, the first terminal is in an idle mode, for example, an RRC_IDLE mode), the network device sends the power control information to the second terminal over a second communication link, and the second terminal forwards the power control information to the first terminal over the first communication link. When the first terminal is a relay terminal and the second terminal is a remote terminal, the network device sends the power control information to the first terminal over a second communication link.

In this embodiment, the dedicated power control information is used, so that the transmit power used by the first terminal during D2D communication is not excessively high. Therefore, power consumption of the first terminal can be reduced, and interference to the network device can be reduced. A resource allocated by the network device for D2D communication is an uplink resource used when the network device communicates with a terminal, that is, the network device determines some of uplink resources for D2D communication. When resources are multiplexed in uplink transmission and D2D communication, if a transmit power used by the terminal during D2D communication is excessively high, interference is caused to the network device. Therefore, the transmit power used by the terminal during D2D communication is controlled, to reduce the interference to the network device.

Optionally, the power control information further includes common power control information. The common power control information is used to control an upper limit of a transmit power that is used, during D2D communication, by a terminal camping on a cell corresponding to the network device. The common power control information may be determined by the network device. The network device may send the dedicated power control information and the common power control information together to the first terminal, or may separately send the dedicated power control information and the common power control information to the first terminal. For example, the common power control information may be sent in a broadcast manner. Optionally, because the common power control information indicates a transmit power upper limit, a value indicated by the dedicated power control information is represented by using an offset of the upper limit. For example, if the transmit power upper limit indicated by the common power control information is a, and the value indicated by the dedicated power control information is b, the dedicated power control information is represented by using a value a−b. In the foregoing manner, a quantity of bits occupied by the dedicated power control information can be reduced to some extent.

In this embodiment, the common power control information is used to perform overall control on the upper limit of the transmit power that is used, during D2D communication, by the terminal camping on the cell corresponding to the network device, so that interference to a network device corresponding to a neighboring cell can be reduced.

Correspondingly, the first terminal receives the power control information.

Step 604. The first terminal determines a target transmit power based on the power control information.

If the dedicated power control information includes the transmit power used by the first terminal when the first terminal communicates with the second terminal, the first terminal determines the used transmit power as the target transmit power.

If the dedicated power control information includes the threshold of the transmit power used by the first terminal when the first terminal communicates with the second terminal, the first terminal obtains a path loss on the first communication link, and the first terminal determines the target transmit power based on the threshold and the path loss.

If the dedicated power control information includes the expected receive power value of the second terminal, the first terminal obtains a path loss on the first communication link, and the first terminal determines the target transmit power based on the expected receive power value of the second terminal and the path loss.

Optionally, the first terminal obtains the path loss on the first communication link in the following manner: The first terminal obtains a receive power value of a signal that is sent by the second terminal on the first communication link and a transmit power value that is used by the second terminal to send the signal, and the first terminal calculates the path loss on the first communication link based on the receive power value and the transmit power value. The receive power value may be obtained by the first terminal by measuring a power value of the signal that is sent by the second terminal on the first communication link, and the transmit power value may be notified by the second terminal to the first terminal.

In addition, when the power control information further includes the common power control information, because the common power control information indicates the upper limit of the transmit power that is used, during D2D communication, by the terminal camping on the cell corresponding to the network device, the first terminal determines the target transmit power with reference to both the dedicated power control information and the common power control information, and the target transmit power is less than or equal to the upper limit.

Step 605. The first terminal sends first data to the second terminal based on the target transmit power.

Correspondingly, the second terminal receives the first data that is sent by the first terminal based on the target transmit power.

In conclusion, in the method provided in this embodiment, because the power control information obtained by the first terminal is the information used to control the transmit power used by the first terminal when the first terminal communicates with the second terminal, the following prior-art problem is resolved: In a relay or D2D communication scenario, a base station does not configure, for a specific terminal, a transmit power used by the terminal during D2D communication. Therefore, transmit powers used by different terminals during D2D communication are indicated to the different terminals, and a power control effect is improved.

In addition, in the method provided in this embodiment, a feedback mechanism is added, and the second terminal feeds back the receive power value of the second terminal to the network device, to assist the network device in adjusting the transmit power of the first terminal more appropriately. Therefore, accuracy of determining a transmit power used by a terminal during D2D communication is improved, and power consumption of the first terminal is reduced to a greatest extent when it is ensured that the second terminal can correctly decode the D2D data sent by the first terminal.

In addition, the common power control information is further sent to the first terminal, and the first terminal determines the target transmit power with reference to both the dedicated power control information and the common power control information, so that the network device can separately control, by using the dedicated power control information and the common power control information, interference caused by the first terminal to the network device corresponding to the serving cell and the network device corresponding to the neighboring cell.

Embodiment 5

Figure 7:
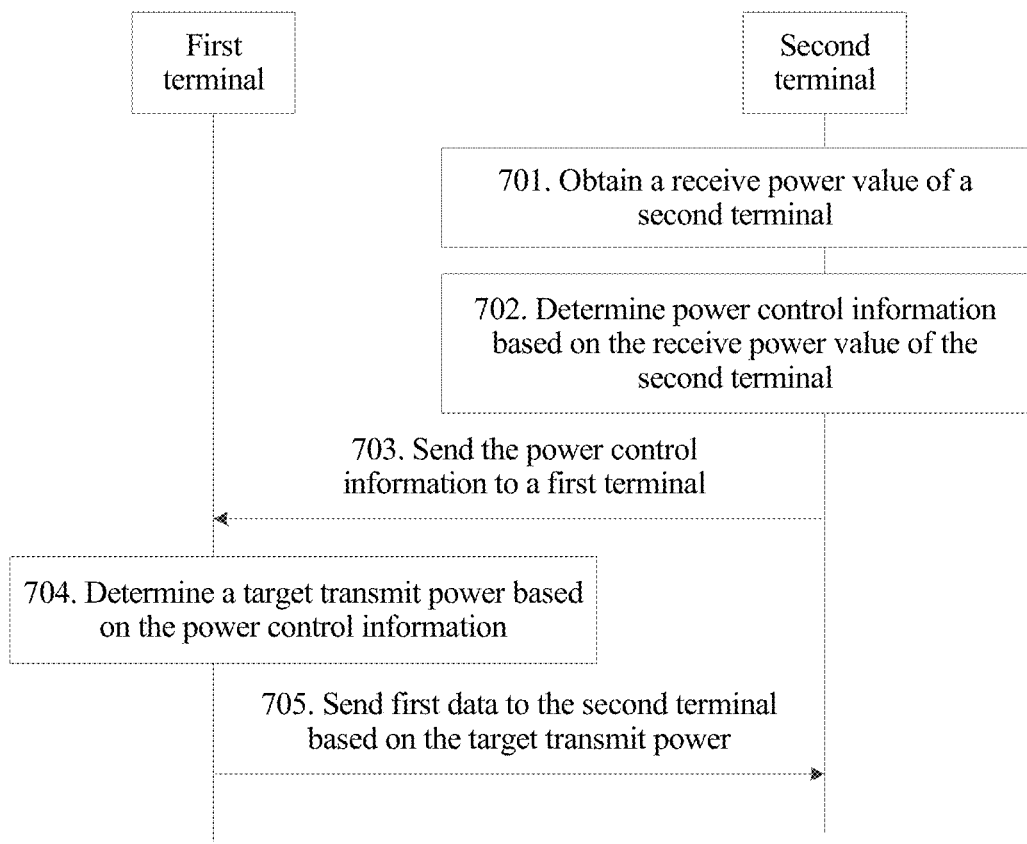
FIG. 7 is a flowchart of a power control method according to another embodiment of the present disclosure.

FIG. 7 is a flowchart of a power control method according to another embodiment of the present disclosure. The method may include the following several steps.

Step 701. A second terminal obtains a receive power value of the second terminal.

The receive power value of the second terminal is a power value of a signal that is sent by a first terminal on a first communication link and that is received by the second terminal. In an example, the receive power value of the second terminal is an actual receive power value of the second terminal. In another example, the receive power value of the second terminal is an expected receive power value of the second terminal. For related definitions and descriptions of the actual receive power value and the expected receive power value of the second terminal, refer to the descriptions in the embodiment shown in FIG. 6. Details are not described herein again.

Step 702. The second terminal determines power control information based on the receive power value of the second terminal.

Step 703. The second terminal sends the power control information to a first terminal.

Same as the embodiment shown in FIG. 6, in this embodiment, the power control information includes dedicated power control information, and the dedicated power control information is information used to control a transmit power used by the first terminal when the first terminal communicates with the second terminal. Different from the embodiment shown in FIG. 6, in this embodiment, the dedicated power control information is determined by the second terminal based on the receive power value of the second terminal. For several possible implementations of the dedicated power control information, refer to the descriptions in the embodiment shown in FIG. 6. Details are not described herein again.

Optionally, the power control information further includes common power control information. The common power control information is used to control an upper limit of a transmit power that is used, during D2D communication, by a terminal camping on a cell corresponding to a network device. The common power control information may be determined by the network device and then provided for the second terminal. The second terminal may send the dedicated power control information and the common power control information together to the first terminal, or may separately send the dedicated power control information and the common power control information to the first terminal. Certainly, in another possible implementation, the network device may send the common power control information to the first terminal.

In addition, the second terminal measures the power value of the signal that is sent by the first terminal on the first communication link, and uses the power value as the actual receive power value of the second terminal. When the actual receive power value of the second terminal is greater than a second threshold or less than a third threshold, the second terminal performs steps 702 and 703. For example, the second threshold may be greater than the third threshold.

Correspondingly, the first terminal receives the power control information sent by the second terminal.

Step 704. The first terminal determines a target transmit power based on the power control information.

Step 705. The first terminal sends first data to the second terminal based on the target transmit power.

For related descriptions of steps 704 and 705, refer to the related descriptions of steps 604 and 605 in the embodiment shown in FIG. 6. Details are not described herein again.

Correspondingly, the second terminal receives the first data that is sent by the first terminal based on the target transmit power.

In conclusion, in the method provided in this embodiment, because the power control information obtained by the first terminal is the information used to control the transmit power used by the first terminal when the first terminal communicates with the second terminal, the following prior-art problem is resolved: In a relay or D2D communication scenario, a base station does not configure, for a specific terminal, a transmit power used by the terminal during D2D communication. Therefore, transmit powers used by different terminals during D2D communication are indicated to the different terminals, and a power control effect is improved.

In addition, the second terminal can adjust the transmit power of the first terminal more appropriately based on the receive power value of the second terminal. Therefore, accuracy of determining a transmit power used by a terminal during D2D communication is improved, and power consumption of the first terminal is reduced to a greatest extent when it is ensured that the second terminal can correctly decode D2D data sent by the first terminal.

Embodiment 6

Figure 8:
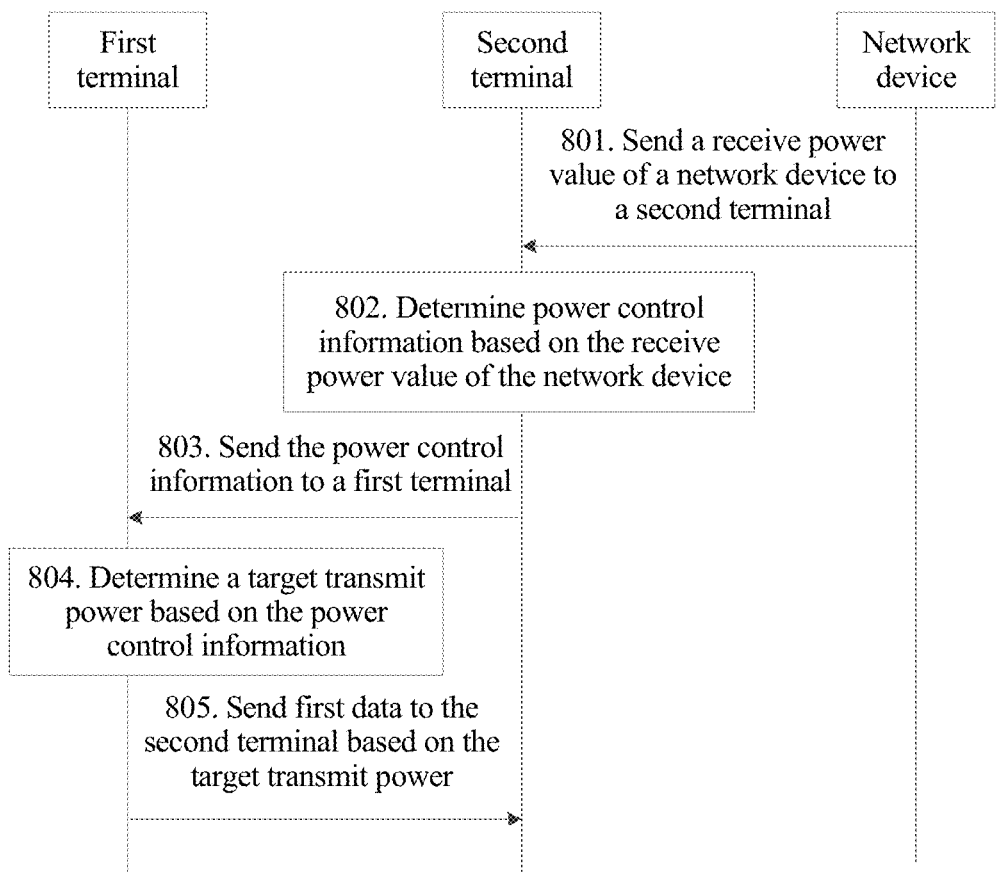
FIG. 8 is a flowchart of a power control method according to another embodiment of the present disclosure.

FIG. 8 is a flowchart of a power control method according to another embodiment of the present disclosure. The method may include the following several steps.

Step 801. A network device sends a receive power value of the network device to a second terminal.

The receive power value of the network device is a power value of a signal that is sent by a first terminal on a first communication link and that is received by the network device. To be specific, the receive power value of the network device is a power value of a D2D signal that is sent by the first terminal and that is received by the network device.

In an example, the receive power value of the network device is an actual receive power value of the network device. The actual receive power value of the network device is a power value of a signal that is sent by the first terminal on the first communication link and that is actually received by the network device. When the first terminal performs D2D communication with the second terminal, the network device may receive a D2D signal sent by the first terminal. In this case, the network device may perform power measurement on the D2D signal. In this embodiment, the network device sends a measurement result to the second terminal, to instruct the second terminal to adjust a transmit power of the first terminal, to reduce interference to the network device. As described above, resources may be multiplexed in uplink transmission and D2D communication. To ensure that the network device is not interfered with by a terminal performing D2D communication, the network device sends the actual receive power value of the network device to the second terminal, to indicate, to the second terminal, a status of interference caused by the first terminal to the network device, so that the second terminal controls the transmit power of the first terminal based on the status of the interference, to reduce the interference to the network device.

In another example, the receive power value of the network device is an expected receive power value of the network device. The expected receive power value of the network device is a power value of a signal that is sent by the first terminal on the first communication link and that the network device expects to receive. Optionally, the expected receive power value may be an upper limit value. To be specific, when the first terminal performs D2D communication with the second terminal, a signal power cannot exceed the upper limit value when a D2D signal sent by the first terminal arrives at the network device, and if the signal power exceeds the upper limit value, strong interference may be caused to the network device. The expected receive power value of the network device may be determined by the network device corresponding to a serving cell, or may be obtained through interaction between the network device and a network device corresponding to a neighboring cell. After the expected receive power value is used, it can be ensured that the first terminal does not cause interference to the network device corresponding to the serving cell or the network device corresponding to the neighboring cell, or reduces interference to the network device corresponding to the serving cell or the network device corresponding to the neighboring cell.

Optionally, the network device measures the power value of the signal that is sent by the first terminal on the first communication link, and uses the power value as the actual receive power value of the network device. When the actual receive power value of the network device is greater than a first threshold, the network device sends the actual receive power value or the expected receive power value of the network device to the second terminal. When the actual receive power value of the network device is greater than the first threshold, it indicates that the transmit power of the first terminal is excessively high. To reduce the interference caused by the first terminal to the network device corresponding to the serving cell or the network device corresponding to the neighboring cell, in this embodiment, the network device performs the step of sending the actual receive power value or the expected receive power value of the network device to the second terminal, so that the second terminal controls the first terminal to decrease the transmit power.

In addition, when the first terminal is a remote terminal and the second terminal is a relay terminal, the network device sends the receive power value of the network device to the second terminal over a second communication link. When the first terminal is a relay terminal and the second terminal is a remote terminal, if a second communication link is established between the second terminal and the network device (that is, the second terminal is in a connected mode, for example, an RRC_CONNECTED mode), the network device sends the receive power value of the network device to the second terminal over the second communication link. If no second communication link is established between the second terminal and the network device (that is, the second terminal is in an idle mode, for example, an RRC_IDLE mode), the network device sends the receive power value of the network device to the first terminal over a second communication link, and the first terminal forwards the receive power value of the network device to the second terminal over the first communication link.

Correspondingly, the second terminal receives the receive power value of the network device.

Step 802. The second terminal determines power control information based on the receive power value of the network device.

Step 803. The second terminal sends the power control information to a first terminal.

In this embodiment, the power control information includes dedicated power control information, and the dedicated power control information is information used to control a transmit power used by the first terminal when the first terminal communicates with the second terminal. In this embodiment, the dedicated power control information is determined by the second terminal based on the receive power value of the network device.

In an example, the dedicated power control information includes the transmit power used by the first terminal when the first terminal communicates with the second terminal. In another example, the dedicated power control information includes a threshold of the transmit power used by the first terminal when the first terminal communicates with the second terminal. The threshold includes an upper limit of the transmit power of the first terminal. Optionally, the threshold further includes a lower limit of the transmit power of the first terminal.

In this embodiment, the dedicated power control information is used, so that the transmit power used by the first terminal during D2D communication is not excessively high. Therefore, power consumption of the first terminal can be reduced to a greatest extent when it is ensured that the second terminal can correctly decode D2D data sent by the first terminal, and the interference to the network device can be reduced.

Optionally, the power control information further includes common power control information. The common power control information is used to control an upper limit of a transmit power that is used, during D2D communication, by a terminal camping on the cell corresponding to the network device. The common power control information may be determined by the second terminal based on the receive power value of the network device. The second terminal may send the dedicated power control information and the common power control information together to the first terminal, or may separately send the dedicated power control information and the common power control information to the first terminal. Certainly, in another possible implementation, the network device may determine the common power control information based on the receive power value of the network device, and send the common power control information to each terminal in a broadcast manner. Optionally, because the common power control information indicates a transmit power upper limit, a value indicated by the dedicated power control information is represented by using an offset of the upper limit.

In this embodiment, the common power control information is used to perform overall control on the upper limit of the transmit power that is used, during D2D communication, of the terminal camping on the cell corresponding to the network device. Therefore, it can be ensured that the first terminal does not cause interference to the network device corresponding to the serving cell or the network device corresponding to the neighboring cell, or reduces interference to the network device corresponding to the serving cell or the network device corresponding to the neighboring cell.

Correspondingly, the first terminal receives the power control information sent by the second terminal.

Step 804. The first terminal determines a target transmit power based on the power control information.

If the dedicated power control information includes the transmit power used by the first terminal when the first terminal communicates with the second terminal, the first terminal determines the used transmit power as the target transmit power.

If the dedicated power control information includes the threshold of the transmit power used by the first terminal when the first terminal communicates with the second terminal, the first terminal obtains a path loss on the first communication link, and the first terminal determines the target transmit power based on the threshold and the path loss.

Optionally, the first terminal obtains the path loss on the first communication link in the following manner: The first terminal obtains a receive power value of a signal that is sent by the second terminal on the first communication link and a transmit power value that is used by the second terminal to send the signal, and the first terminal calculates the path loss on the first communication link based on the receive power value and the transmit power value. The receive power value may be obtained by the first terminal by measuring a power value of the signal that is sent by the second terminal on the first communication link, and the transmit power value may be notified by the second terminal to the first terminal.

In addition, when the power control information further includes the common power control information, because the common power control information indicates the upper limit of the transmit power that is used, during D2D communication, by the terminal camping on the cell corresponding to the network device, the first terminal determines the target transmit power with reference to both the dedicated power control information and the common power control information, and the target transmit power is less than or equal to the upper limit.

Step 805. The first terminal sends first data to the second terminal based on the target transmit power.

Correspondingly, the second terminal receives the first data that is sent by the first terminal based on the target transmit power.

In conclusion, in the method provided in this embodiment, because the power control information obtained by the first terminal is the information used to control the transmit power used by the first terminal when the first terminal communicates with the second terminal, the following prior-art problem is resolved: In a relay or D2D communication scenario, a base station does not configure, for a specific terminal, a transmit power used by the terminal during D2D communication. Therefore, transmit powers used by different terminals during D2D communication are indicated to the different terminals, and a power control effect is improved.

In addition, the network device further indicates, to the second terminal, a requirement of the network device on the transmit power of the first terminal, the second terminal controls, based on the indication of the network device and with reference to a requirement of the second terminal on the transmit power of the first terminal, the first terminal to adjust the transmit power. Therefore, accuracy of determining a transmit power used by a terminal during D2D communication is improved, and power consumption of the first terminal is reduced to a greatest extent when it is ensured that the second terminal can correctly decode D2D data sent by the first terminal.

In addition, the common power control information is further sent to the first terminal, and the first terminal determines the target transmit power with reference to both the dedicated power control information and the common power control information, so that the second terminal can separately control, by using the dedicated power control information and the common power control information, interference caused by the first terminal to the network device corresponding to the serving cell and the network device corresponding to the neighboring cell.

Embodiment 7

Figure 9:
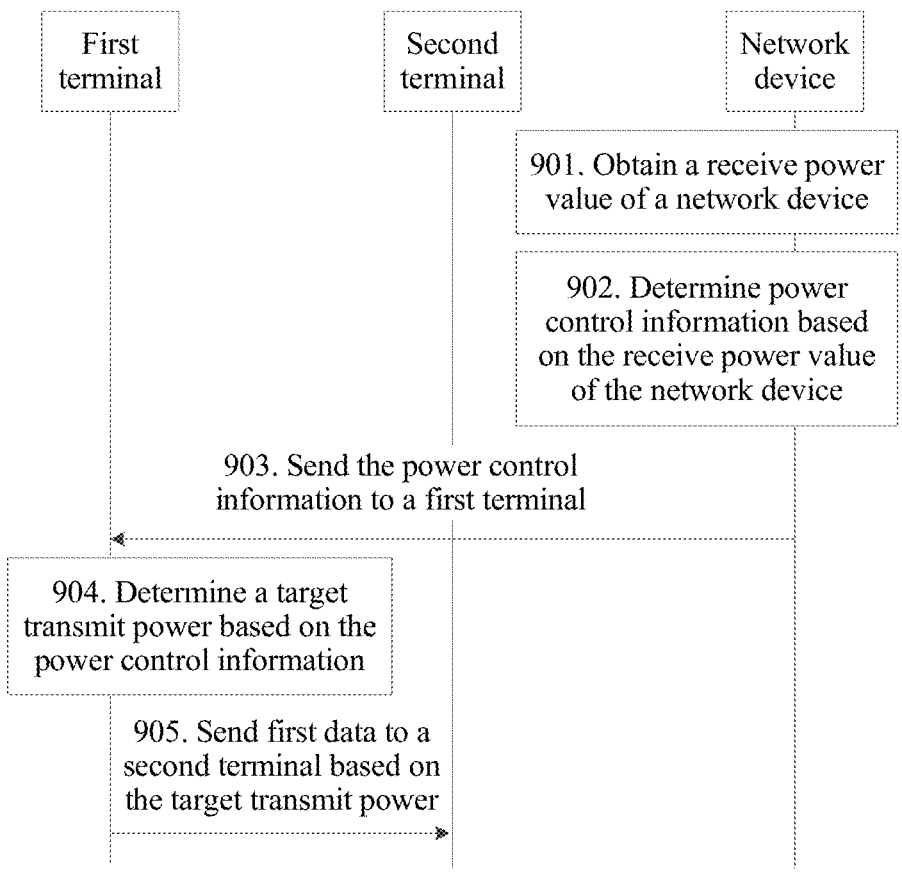
FIG. 9 is a flowchart of a power control method according to another embodiment of the present disclosure.

FIG. 9 is a flowchart of a power control method according to another embodiment of the present disclosure. The method may include the following several steps.

Step 901. A network device obtains a receive power value of the network device.

The receive power value of the network device is a power value of a signal that is sent by a first terminal on a first communication link and that is received by the network device. In an example, the receive power value of the network device is an actual receive power value of the network device. In another example, the receive power value of the network device is an expected receive power value of the network device. For related definitions and descriptions of the actual receive power value and the expected receive power value of the network device, refer to the descriptions in the embodiment shown in FIG. 8. Details are not described herein again.

Step 902. The network device determines power control information based on the receive power value of the network device.

Step 903. The network device sends the power control information to a first terminal.

Same as the embodiment shown in FIG. 8, in this embodiment, the power control information includes dedicated power control information, and the dedicated power control information is information used to control a transmit power used by the first terminal when the first terminal communicates with a second terminal. Different from the embodiment shown in FIG. 8, in this embodiment, the dedicated power control information is determined by the network device based on the receive power value of the network device. For several possible implementations of the dedicated power control information, refer to the descriptions in the embodiment shown in FIG. 8. Details are not described herein again.

Optionally, the power control information further includes common power control information. The common power control information is used to control an upper limit of a transmit power that is used, during D2D communication, by a terminal camping on a cell corresponding to the network device. The network device may send the dedicated power control information and the common power control information together to the first terminal, or may separately send the dedicated power control information and the common power control information to the first terminal.

Optionally, the network device measures the power value of the signal that is sent by the first terminal on the first communication link, and uses the power value as the actual receive power value of the network device. When the actual receive power value of the network device is greater than a first threshold, the network device performs steps 902 and 903.

In addition, when the first terminal is a remote terminal and the second terminal is a relay terminal, if a second communication link is established between the first terminal and the network device (that is, the first terminal is in a connected mode, for example, an RRC_CONNECTED mode), the network device sends the power control information to the first terminal over the second communication link. If no second communication link is established between the first terminal and the network device (that is, the first terminal is in an idle mode, for example, an RRC_IDLE mode), the network device sends the power control information to the second terminal over a second communication link, and the second terminal forwards the power control information to the first terminal over the first communication link. When the first terminal is a relay terminal and the second terminal is a remote terminal, the network device sends the power control information to the first terminal over a second communication link.

Correspondingly, the first terminal receives the power control information sent by the network device.

Step 904. The first terminal determines a target transmit power based on the power control information.

Step 905. The first terminal sends first data to a second terminal based on the target transmit power.

For related descriptions of steps 904 and 905, refer to the related descriptions of steps 804 and 805 in the embodiment shown in FIG. 8. Details are not described herein again.

Correspondingly, the second terminal receives the first data that is sent by the first terminal based on the target transmit power.

In conclusion, in the method provided in this embodiment, because the power control information obtained by the first terminal is the information used to control the transmit power used by the first terminal when the first terminal communicates with the second terminal, the following prior-art problem is resolved: In a relay or D2D communication scenario, a base station does not configure, for a specific terminal, a transmit power used by the terminal during D2D communication. Therefore, transmit powers used by different terminals during D2D communication are indicated to the different terminals, and a power control effect is improved.

In addition, the network device can adjust the transmit power of the first terminal more appropriately based on the receive power value of the network device. Therefore, accuracy of determining a transmit power used by a terminal during D2D communication is improved, and power consumption of the first terminal is reduced to a greatest extent when it is ensured that the second terminal can correctly decode D2D data sent by the first terminal.

Figure 10:
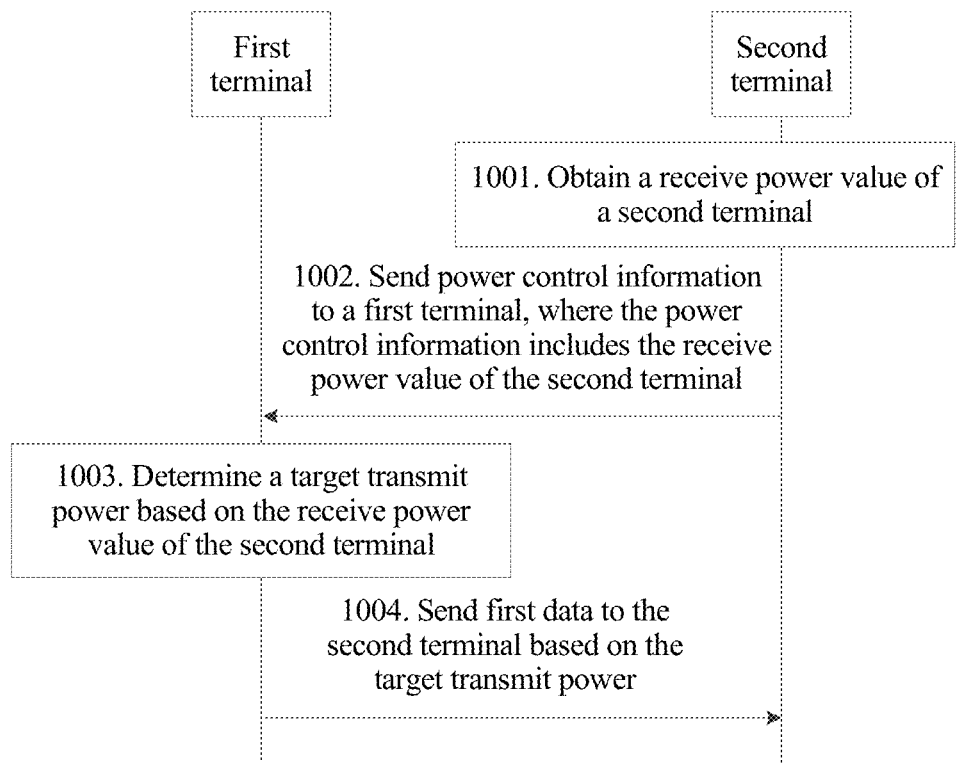
FIG. 10 is a flowchart of a power control method according to another embodiment of the present disclosure.
Figure 11:
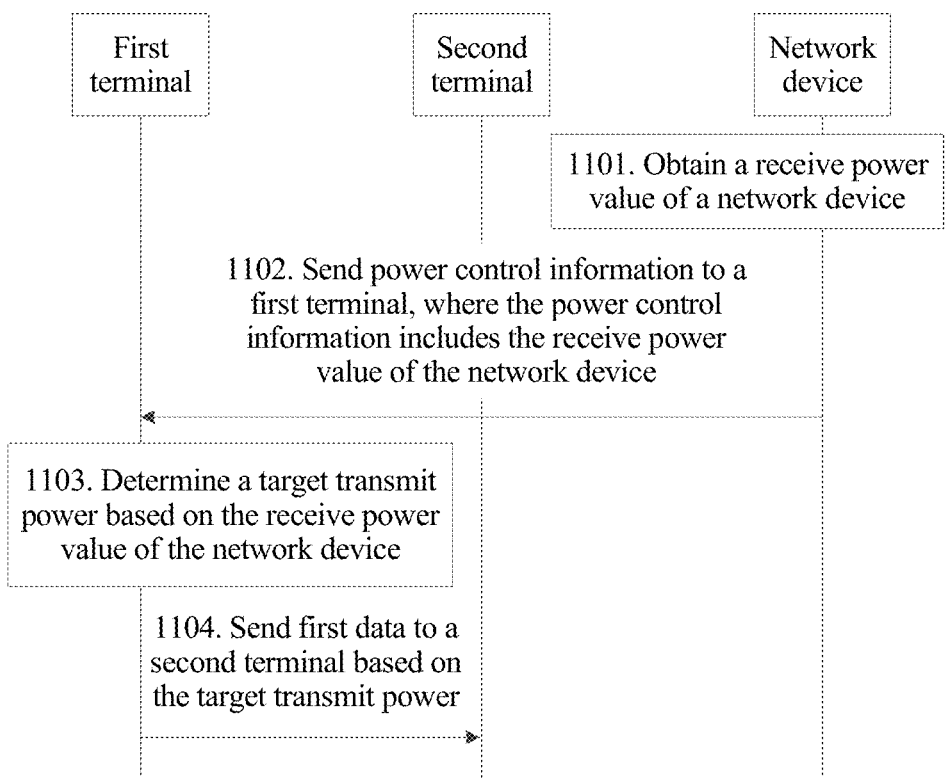
FIG. 11 is a flowchart of a power control method according to another embodiment of the present disclosure.

In the following embodiments shown in FIG. 10 and FIG. 11, power control information includes a receive power value. A first terminal determines, based on the receive power value, a target transmit power used by the first terminal when the first terminal communicates with a second terminal. The embodiment shown in FIG. 10 is described by using an example in which the receive power value is a receive power value of the second terminal. The embodiment shown in FIG. 11 is described by using an example in which the receive power value is a receive power value of a network device.

Embodiment 8

FIG. 10 is a flowchart of a power control method according to another embodiment of the present disclosure. The method may include the following several steps.

Step 1001. A second terminal obtains a receive power value of the second terminal.

The receive power value of the second terminal is a power value of a signal that is sent by a first terminal on a first communication link and that is received by the second terminal. In an example, the receive power value of the second terminal is an actual receive power value of the second terminal. In another example, the receive power value of the second terminal is an expected receive power value of the second terminal. For related definitions and descriptions of the actual receive power value and the expected receive power value of the second terminal, refer to the descriptions in the embodiment shown in FIG. 6. Details are not described herein again.

Step 1002. The second terminal sends power control information to a first terminal, where the power control information includes the receive power value of the second terminal.

In the embodiment shown in FIG. 6, the second terminal sends the receive power value of the second terminal to a network device, and the network device determines the power control information based on the receive power value and provides the power control information for the first terminal. In the embodiment shown in FIG. 7, the second terminal determines the power control information based on the receive power value of the second terminal and sends the power control information to the first terminal. Different from the embodiments shown in FIG. 6 and FIG. 7, in this embodiment, the second terminal directly sends the receive power value of the second terminal to the first terminal, and the first terminal determines a target transmit power based on the receive power value.

In addition, the second terminal measures the power value of the signal that is sent by the first terminal on the first communication link, and uses the power value as the actual receive power value of the second terminal. When the actual receive power value of the second terminal is greater than a second threshold or less than a third threshold, the second terminal performs step 1002, to trigger power control. For example, the second threshold may be greater than the third threshold.

Correspondingly, the first terminal receives the receive power value of the second terminal.

Step 1003. The first terminal determines a target transmit power based on the receive power value of the second terminal.

When the receive power value of the second terminal is the actual receive power value of the second terminal, the first terminal may determine the target transmit power based on the actual receive power value and a decoding capability of the second terminal. The determined target transmit power is a power value that can ensure that D2D data sent by the first terminal is correctly decoded by the second terminal and that is not excessively high.

When the receive power value of the second terminal is the expected receive power value of the second terminal, the first terminal may determine the target transmit power based on the expected receive power value of the second terminal and a path loss on the first communication link.

Step 1004. The first terminal sends first data to the second terminal based on the target transmit power.

Correspondingly, the second terminal receives the first data that is sent by the first terminal based on the target transmit power.

In conclusion, in the method provided in this embodiment, because the power control information obtained by the first terminal is information used to control a transmit power used by the first terminal when the first terminal communicates with the second terminal, the following prior-art problem is resolved: In a relay or D2D communication scenario, a base station does not configure, for a specific terminal, a transmit power used by the terminal during D2D communication. Therefore, transmit powers used by different terminals during D2D communication are indicated to the different terminals, and a power control effect is improved.

In addition, the first terminal can adjust the transmit power of the first terminal more appropriately based on the receive power value of the second terminal. Therefore, accuracy of determining a transmit power used by a terminal during D2D communication is improved, and power consumption of the first terminal is reduced to a greatest extent when it is ensured that the second terminal can correctly decode the D2D data sent by the first terminal.

Embodiment 9

FIG. 11 is a flowchart of a power control method according to another embodiment of the present disclosure. The method may include the following several steps.

Step 1101. A network device obtains a receive power value of the network device.

The receive power value of the network device is a power value of a signal that is sent by a first terminal on a first communication link and that is received by the network device. In an example, the receive power value of the network device is an actual receive power value of the network device. In another example, the receive power value of the network device is an expected receive power value of the network device. For related definitions and descriptions of the actual receive power value and the expected receive power value of the network device, refer to the descriptions in the embodiment shown in FIG. 8. Details are not described herein again.

Step 1102. The network device sends power control information to a first terminal, where the power control information includes the receive power value of the network device.

In the embodiment shown in FIG. 8, the network device sends the receive power value of the network device to a second terminal, and the second terminal determines the power control information based on the receive power value and sends the power control information to the first terminal. In the embodiment shown in FIG. 9, the network device determines the power control information based on the receive power value of the network device and provides the power control information for the first terminal. Different from the embodiments shown in FIG. 8 and FIG. 9, in this embodiment, the network device directly sends the receive power value of the network device to the first terminal, and the first terminal determines a target transmit power based on the receive power value.

In addition, when the first terminal is a remote terminal and the second terminal is a relay terminal, if a second communication link is established between the first terminal and the network device (that is, the first terminal is in a connected mode, for example, an RRC_CONNECTED mode), the network device sends the receive power value of the network device to the first terminal over the second communication link. If no second communication link is established between the first terminal and the network device (that is, the first terminal is in an idle mode, for example, an RRC_IDLE mode), the network device sends the receive power value of the network device to the second terminal over a second communication link, and the second terminal forwards the receive power value of the network device to the first terminal over the first communication link. When the first terminal is a relay terminal and the second terminal is a remote terminal, the network device sends the receive power value of the network device to the first terminal over a second communication link.

Correspondingly, the first terminal receives the receive power value of the network device.

Step 1103. The first terminal determines a target transmit power based on the receive power value of the network device.

When the receive power value of the network device is the actual receive power value of the network device, the first terminal may determine the target transmit power based on the actual receive power value and a requirement of the network device on a transmit power. The determined target transmit power is a power value that can ensure that the first terminal does not cause interference to the network device corresponding to a serving cell or a network device corresponding to a neighboring cell, or reduces interference to the network device corresponding to a serving cell or a network device corresponding to a neighboring cell.

When the receive power value of the network device is the expected receive power value of the network device, the first terminal may determine the target transmit power based on the expected receive power value of the network device and a path loss generated when a D2D signal arrives at the network device.

Step 1104. The first terminal sends first data to a second terminal based on the target transmit power.

Correspondingly, the second terminal receives the first data that is sent by the first terminal based on the target transmit power.

In conclusion, in the method provided in this embodiment, because the power control information obtained by the first terminal is information used to control a transmit power used by the first terminal when the first terminal communicates with the second terminal, the following prior-art problem is resolved: In a relay or D2D communication scenario, a base station does not configure, for a specific terminal, a transmit power used by the terminal during D2D communication. Therefore, transmit powers used by different terminals during D2D communication are indicated to the different terminals, and a power control effect is improved.

In addition, the first terminal can adjust the transmit power of the first terminal more appropriately based on the receive power value of the network device. Therefore, accuracy of determining a transmit power used by a terminal during D2D communication is improved, and power consumption of the first terminal is reduced to a greatest extent when it is ensured that the second terminal can correctly decode D2D data sent by the first terminal.

In the following embodiment shown in FIG. 12, power control information includes a transmit power value. A first terminal determines, based on the transmit power value, a target transmit power used by the first terminal when the first terminal communicates with a second terminal.

Embodiment 10

Figure 12:
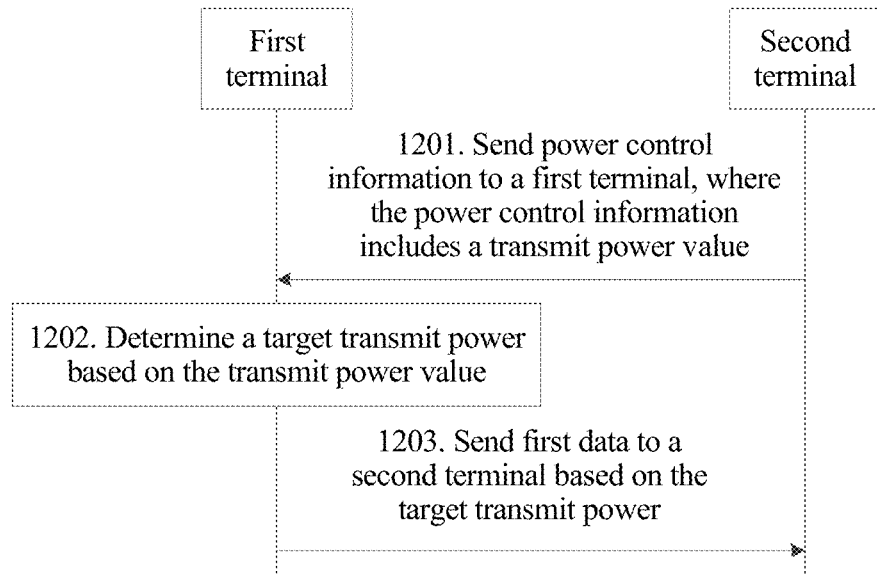
FIG. 12 is a flowchart of a power control method according to another embodiment of the present disclosure.

FIG. 12 is a flowchart of a power control method according to another embodiment of the present disclosure. The method may include the following several steps.

Step 1201. A second terminal sends power control information to a first terminal, where the power control information includes a transmit power value.

The transmit power value is a power value that is used by the second terminal to send a signal to the first terminal on a first communication link. To be specific, the transmit power value is a power value that is used by the second terminal to send a D2D signal.

There are the following two possible implementations of triggering this step to be performed.

In a possible implementation, when the transmit power value of the second terminal is changed, the second terminal sends the transmit power value to the first terminal, that is, sends the changed transmit power value to the first terminal.

In another possible implementation, the second terminal obtains a receive power value of a signal that is sent by the first terminal on the first communication link, and when the receive power value is greater than a second threshold or less than a third threshold, the second terminal sends the transmit power value to the first terminal. For example, the second threshold may be greater than the third threshold. In the foregoing manner, the second terminal indicates, to the first terminal, that a transmit power of the first terminal is excessively high or excessively low, to trigger the first terminal to adjust the transmit power.

Correspondingly, the first terminal receives the transmit power value sent by the second terminal.

Step 1202. The first terminal determines a target transmit power based on the transmit power value.

In an example, the first terminal determines the transmit power value as the target transmit power. To be specific, the first terminal uses the transmit power value of the second terminal as a transmit power value used by the first terminal when the first terminal performs D2D communication with the second terminal.

In another example, the first terminal uses a sum of the transmit power value and a preset offset value as the target transmit power. In a possible implementation, the preset offset value is a preset constant. The target transmit power is $P=P_{Tx} \pm P_0$, where $P_{Tx}$ is the transmit power value of the second terminal, and $P_0$ is the preset constant. In the foregoing manner, a difference between signal receiving capabilities of two parties performing D2D communication and a difference between signal powers required by the two parties to decode data are considered, so that the finally determined target transmit power more accurately meets a requirement of the second terminal. In another possible implementation, the preset offset value is a product of a path loss on the first communication link and a preset coefficient. The target transmit power is $P=P_{Tx}\pm(\alpha\times P_L)$, where $P_{Tx}$ is the transmit power value of the second terminal, $\alpha$ is the preset coefficient, and $P_L$ is the path loss. In the foregoing manner, a difference between path losses generated when two parties performing D2D communication each transmit a signal to a peer is considered, so that the finally determined target transmit power is more accurate.

Optionally, the first terminal obtains the path loss on the first communication link in the following manner: The first terminal obtains a receive power value of a signal that is sent by the second terminal on the first communication link and a transmit power value that is used by the second terminal to send the signal, and the first terminal calculates the path loss on the first communication link based on the receive power value and the transmit power value. For example, a difference between the transmit power value and the receive power value is used as the path loss. The receive power value may be obtained by the first terminal by measuring a power value of a D2D signal sent by the second terminal, and the transmit power value may be sent by the second terminal to the first terminal by using step 1201. In addition, the D2D signal is a signal transmitted over the first communication link. For example, the first terminal may obtain a reference signal received power (RSRP), reference signal received quality (RSRQ), or a signal to interference plus noise ratio (SINR). The first terminal may measure the receive power value based on measurement configuration information of a network device.

Step 1203. The first terminal sends first data to the second terminal based on the target transmit power.

Correspondingly, the second terminal receives the first data that is sent by the first terminal based on the target transmit power.

It should also be noted that, considering that a specific time period needs to be consumed when the first terminal estimates the path loss, if the transmit power value of the second terminal is changed within the time period, a result of estimating the path loss by the first terminal is affected. Therefore, if the second terminal sends the transmit power value to the first terminal by using the first possible implementation in step 1201, the second terminal does not change the transmit power value of the second terminal within a predetermined time period after the second terminal sends the transmit power value to the first terminal, so that the first terminal more accurately estimates the path loss.

In conclusion, in the method provided in this embodiment, because the power control information obtained by the first terminal is information used to control a transmit power used by the first terminal when the first terminal communicates with the second terminal, the following prior-art problem is resolved: In a relay or D2D communication scenario, a base station does not configure, for a specific terminal, a transmit power used by the terminal during D2D communication. Therefore, transmit powers used by different terminals during D2D communication are indicated to the different terminals, and a power control effect is improved.

In addition, the second terminal sends the transmit power value to the first terminal, so that the first terminal determines, based on the transmit power value, the transmit power used by the first terminal when the first terminal performs D2D communication with the second terminal. Therefore, accuracy of determining a transmit power used by a terminal during D2D communication is improved, and power consumption of the first terminal is reduced to a greatest extent when it is ensured that the second terminal can correctly decode D2D data sent by the first terminal.

In addition, the first terminal further uses the sum of the transmit power value and the preset offset value as the target transmit power, and the difference between the two parties performing D2D communication is considered when the transmit power of the first terminal is determined, so that the finally determined target transmit power more accurately meets the requirement of the second terminal.

Figure 13:
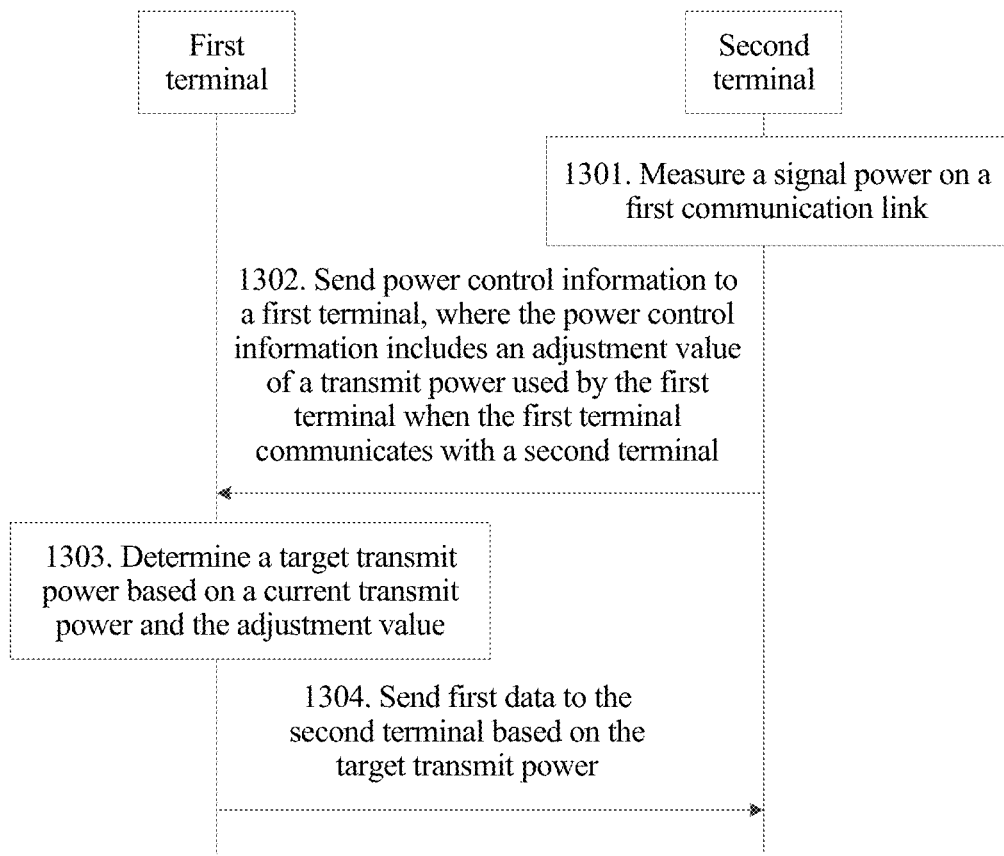
FIG. 13 is a flowchart of a power control method according to another embodiment of the present disclosure.

In the following embodiment shown in FIG. 13, power control information includes an adjustment value of a transmit power used by a first terminal when the first terminal communicates with a second terminal. The first terminal determines, based on the adjustment value, a target transmit power used by the first terminal when the first terminal communicates with the second terminal.

Embodiment 11

Step 1301. A second terminal measures a signal power on a first communication link.

In a process in which the second terminal performs D2D communication with a first terminal, the second terminal measures the signal power on the first communication link periodically or based on a configuration requirement. The second terminal may perform measurement based on measurement configuration information of a network device, and the measurement configuration information may include a measurement object and/or an event that triggers power control. The measurement object is an object measured by the second terminal. For example, the measurement object may include a carrier frequency in cellular communication and a carrier frequency in D2D communication. The event that triggers power control means that when a condition is met, the second terminal sends power control information to the first terminal. For example, when it is obtained through measurement that the signal power on the first communication link is greater than a first threshold or less than a second threshold, power control is triggered, and the second terminal sends the power control information to the first terminal.

Step 1302. The second terminal sends power control information to a first terminal, where the power control information includes an adjustment value of a transmit power used by the first terminal when the first terminal communicates with the second terminal.

When the signal power is greater than the first threshold, the second terminal sends, to the first terminal, the power control information used to instruct to decrease the transmit power. When the signal power is less than the second threshold, the second terminal sends, to the first terminal, the power control information used to instruct to increase the transmit power.

The adjustment value includes first indication information used to instruct to increase or decrease the transmit power. For example, the first indication information is a positive value or a negative value. The positive value is used to instruct to increase the transmit power, and the negative value is used to instruct to decrease the transmit power. Alternatively, the positive value is used to instruct to decrease the transmit power, and the negative value is used to instruct to increase the transmit power. Optionally, the adjustment value further includes second indication information used to indicate an adjustment amount of the transmit power.

For example, the first threshold may be greater than the second threshold. The first threshold is determined by the second terminal based on whether the second terminal can decode D2D data sent by the first terminal. To be specific, if a power value of a D2D signal sent by the first terminal is the first threshold when the D2D signal arrives at the second terminal, the second terminal can correctly decode the data, and if the power value is higher, decoding efficiency is not greatly improved. A process of determining the second threshold is similar to the foregoing process. To be specific, the second threshold is a lowest limit that can ensure that the second terminal correctly decodes D2D data sent by the first terminal. If a power value of a D2D signal sent by the first terminal is less than the second threshold when the D2D signal arrives at the second terminal, the second terminal can hardly decode the data correctly.

Step 1303. The first terminal determines a target transmit power based on a current transmit power and the adjustment value.

When the adjustment value instructs to decrease the transmit power, the first terminal decreases the current transmit power, to obtain the target transmit power. For example, assuming that the current transmit power is a, the first terminal decreases the current transmit power by b, to obtain the target transmit power a+b.

When the adjustment value instructs to increase the transmit power, the first terminal increases the current transmit power, to obtain the target transmit power. For example, assuming that the current transmit power is a, the first terminal increases the current transmit power by c, to obtain the target transmit power a+c.

The adjustment amount of the transmit power may be indicated by the second terminal, or may be determined by the first terminal based on a preset configuration parameter.

Step 1304. The first terminal sends first data to the second terminal based on the target transmit power.

Correspondingly, the second terminal receives the first data that is sent by the first terminal based on the target transmit power.

In conclusion, in the method provided in this embodiment, because the power control information obtained by the first terminal is information used to control the transmit power used by the first terminal when the first terminal communicates with the second terminal, the following prior-art problem is resolved: In a relay or D2D communication scenario, a base station does not configure, for a specific terminal, a transmit power used by the terminal during D2D communication. Therefore, transmit powers used by different terminals during D2D communication are indicated to the different terminals, and a power control effect is improved.

In addition, the second terminal measures the signal power on the first communication link, and power adjustment is triggered when the signal power is greater than the first threshold or less than the second threshold, so that the transmit power used by the first terminal during D2D communication is dynamically controlled.

It should be noted that in the embodiments of the present disclosure, a type of the first data (namely, the D2D data) sent between terminals is not limited, and the first data may be any data, for example, control signaling or service data.

It should further be noted that in the method embodiments, steps related to a first terminal side may be independently implemented as a power control method on the first terminal side, steps related to a second terminal side may be independently implemented as a power control method on the second terminal side, and steps related to a network device side may be independently implemented as a power control method on the network device side.

Apparatus embodiments of the present disclosure are provided in the following, and may be used to execute the method embodiments of the present disclosure. For details that are not disclosed in the apparatus embodiments of the present disclosure, refer to the method embodiments of the present disclosure.

Figure 14:
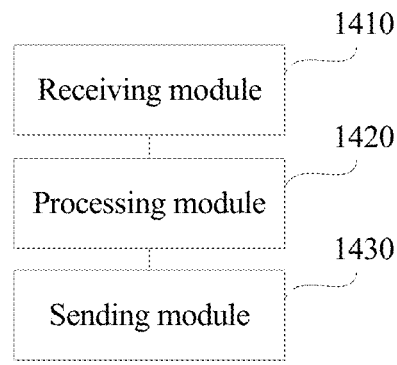
FIG. 14 is a block diagram of a power control apparatus according to an embodiment of the present disclosure.

FIG. 14 is a block diagram of a power control apparatus according to an embodiment of the present disclosure. The apparatus has a function of implementing the method on the first terminal side in the foregoing example. The function may be implemented by hardware, or may be implemented by executing corresponding software by hardware. The apparatus may be applied to a first terminal, and may include a receiving module 1410, a processing module 1420, and a sending module 1430.

The receiving module 1410 is configured to obtain power control information. The power control information is information used to control a transmit power used by the first terminal when the first terminal communicates with a second terminal. A first communication link is established between the first terminal and the second terminal.

In an example, the receiving module 1410 is configured to receive the power control information sent by the second terminal. In another example, the receiving module 1410 is configured to receive the power control information sent by a network device.

The processing module 1420 is configured to determine a target transmit power based on the power control information.

The sending module 1430 is configured to send first data to the second terminal based on the target transmit power.

In conclusion, according to the apparatus provided in this embodiment, because the power control information obtained by the first terminal is the information used to control the transmit power used by the first terminal when the first terminal communicates with the second terminal, the following prior-art problem is resolved: In a relay or D2D communication scenario, a base station does not configure, for a specific terminal, a transmit power used by the terminal during D2D communication. Therefore, transmit powers used by different terminals during D2D communication are indicated to the different terminals, and a power control effect is improved.

Figure 15:
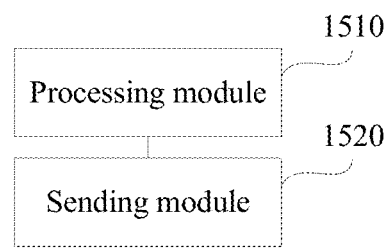
FIG. 15 is a block diagram of a power control apparatus according to another embodiment of the present disclosure.

FIG. 15 is a block diagram of a power control apparatus according to another embodiment of the present disclosure. The apparatus has a function of implementing the method on the network device side in the foregoing example. The function may be implemented by hardware, or may be implemented by executing corresponding software by hardware. The apparatus may be applied to a network device, and may include a processing module 1510 and a sending module 1520.

The processing module 1510 is configured to determine power control information. The power control information is information used to control a transmit power used by a first terminal when the first terminal communicates with a second terminal. A first communication link is established between the first terminal and the second terminal.

In an example, the processing module 1510 is configured to: when the network device receives a receive power value of the second terminal sent by the second terminal, determine the power control information based on the receive power value of the second terminal. The receive power value of the second terminal is a power value of a signal that is sent by the first terminal on the first communication link and that is received by the second terminal.

In another example, the processing module 1510 is configured to: when an actual receive power value of the network device is greater than a first threshold, determine the power control information based on the actual receive power value of the network device. The actual receive power value of the network device is a power value of a signal that is sent by the first terminal on the first communication link and that is actually received by the network device.

The sending module 1520 is configured to send the power control information to the first terminal.

Optionally, the apparatus further includes a receiving module (not shown in the figure). The receiving module is configured to receive information sent by the first terminal and/or the second terminal. The information may be any information received by the network device from the first terminal and/or the second terminal in the method example.

In conclusion, according to the apparatus provided in this embodiment, because the power control information obtained by the first terminal is the information used to control the transmit power used by the first terminal when the first terminal communicates with the second terminal, the following prior-art problem is resolved: In a relay or D2D communication scenario, a base station does not configure, for a specific terminal, a transmit power used by the terminal during D2D communication. Therefore, transmit powers used by different terminals during D2D communication are indicated to the different terminals, and a power control effect is improved.

Figure 16:
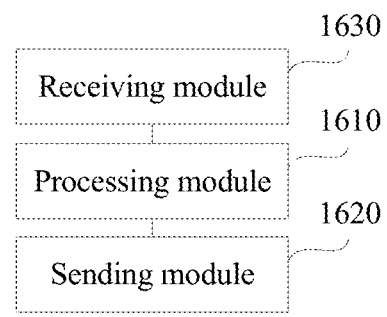
FIG. 16 is a block diagram of a power control apparatus according to another embodiment of the present disclosure.

FIG. 16 is a block diagram of a power control apparatus according to another embodiment of the present disclosure. The apparatus has a function of implementing the method on the second terminal side in the foregoing example. The function may be implemented by hardware, or may be implemented by executing corresponding software by hardware. The apparatus may be applied to a second terminal, and may include a processing module 1610, a sending module 1620, and a receiving module 1630.

The processing module 1610 is configured to determine power control information. The power control information is information used to control a transmit power used by a first terminal when the first terminal communicates with the second terminal. A first communication link is established between the first terminal and the second terminal.

In an example, the processing module 1610 is configured to: when the second terminal receives a receive power value of a network device sent by the network device, determine the power control information based on the receive power value of the network device. The receive power value of the network device is a power value of a signal that is sent by the first terminal on the first communication link and that is received by the network device.

In another example, the processing module 1610 is configured to: when an actual receive power value of the second terminal is greater than a second threshold or less than a third threshold, determine the power control information based on the actual receive power value of the second terminal. The actual receive power value of the second terminal is a power value of a signal that is sent by the first terminal on the first communication link and that is actually received by the second terminal.

The sending module 1620 is configured to send the power control information to the first terminal.

The receiving module 1630 is configured to receive first data that is sent by the first terminal based on a target transmit power.

In conclusion, according to the apparatus provided in this embodiment, because the power control information obtained by the first terminal is the information used to control the transmit power used by the first terminal when the first terminal communicates with the second terminal, the following prior-art problem is resolved: In a relay or D2D communication scenario, a base station does not configure, for a specific terminal, a transmit power used by the terminal during D2D communication. Therefore, transmit powers used by different terminals during D2D communication are indicated to the different terminals, and a power control effect is improved.

It should be noted that, when the apparatus provided in the foregoing embodiments implements the functions of the apparatus, division of the foregoing function modules is only used as an example for description. In actual application, the foregoing functions may be allocated to different function modules for implementation as required, that is, an inner structure of a device is divided into different function modules, to implement all or some of the functions described above. In addition, the apparatus provided in the foregoing embodiments and the method embodiments pertain to a same concept. For a specific implementation process thereof, refer to the method embodiments. Details are not described herein again.

The foregoing mainly describes the solutions provided in the embodiments of the present disclosure from the perspective of interaction between a network device and a terminal. It may be understood that, to implement the foregoing functions, the network device and the terminal each include a corresponding hardware structure and/or software module for performing each function. Units and algorithm steps in the examples described with reference to the embodiments disclosed in the present disclosure can be implemented in a form of hardware or a combination of hardware and computer software in the embodiments of the present disclosure. Whether a function is performed by hardware or computer software driving hardware depends on particular applications and design constraints of the technical solutions. A person skilled in the art may use different methods to implement the described functions for each particular application, but it should not be considered that the implementation goes beyond the scope of the technical solutions in the embodiments of the present disclosure.

Figure 17:
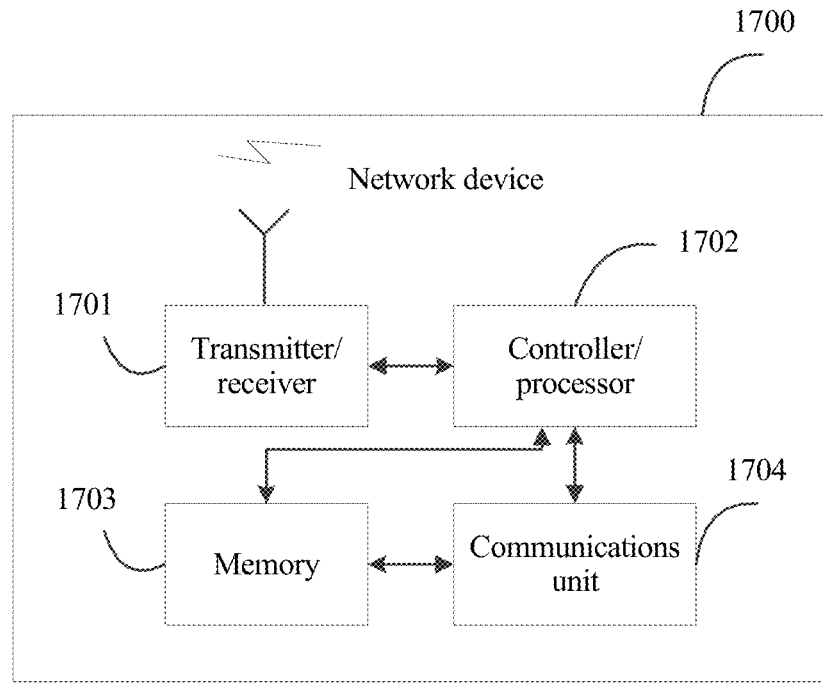
FIG. 17 is a possible schematic structural diagram of a network device according to an embodiment of the present disclosure.

FIG. 17 is a possible schematic structural diagram of a network device according to an embodiment of the present disclosure.

A network device 1700 includes a transmitter/receiver 1701 and a processor 1702. The processor 1702 and the transmitter/receiver 1701 may communicate with each other by using a bus. The transmitter/receiver 1701 sends or receives a signal under the control of the processor 1702. The processor 1702 may be a controller, and is represented as "a controller/processor 1702" in FIG. 17. The transmitter/receiver 1701 is configured to: support the network device in receiving information from and sending information to the terminal in the foregoing embodiments, and support wireless communication between the terminal and another terminal. The processor 1702 performs various functions used to communicate with the terminal. On an uplink, an uplink signal from the terminal is received by an antenna, demodulated by the receiver 1701 (for example, a high-frequency signal is demodulated into a baseband signal), and further processed by the processor 1702, to restore service data and signaling information that are sent by the terminal. On a downlink, service data and a signaling message are processed by the processor 1702, and modulated by the transmitter 1701 (for example, a baseband signal is modulated into a high-frequency signal) to generate a downlink signal, and the downlink signal is transmitted to the terminal by using the antenna. It should be noted that the foregoing demodulation or modulation function may be implemented by the processor 1702. For example, the processor 1702 is further configured to perform the steps on the network device side in the method embodiments, and/or other steps in the technical solutions described in the embodiments of the present disclosure.

Further, the network device 1700 may further include a memory 1703, and the memory 1703 is configured to store program code and data of the network device 1700. In addition, the network device may further include a communications unit 1704. The communications unit 1704 is configured to support the network device in communicating with another network entity (for example, a network device in a core network). For example, in an LTE system, the communications unit 1704 may be an S1-U interface, configured to support the network device in communicating with a serving gateway (SGW); or the communications unit 1704 may be an S1-MME interface, configured to support the network device in communicating with a mobility management entity (MME).

It may be understood that FIG. 17 shows only a simplified design of the network device 1700. In actual application, the network device 1700 may include any quantity of transmitters, receivers, processors, controllers, memories, communications units, or the like. All network devices capable of implementing the embodiments of the present disclosure fall within the protection scope of the embodiments of the present disclosure.

Figure 18:
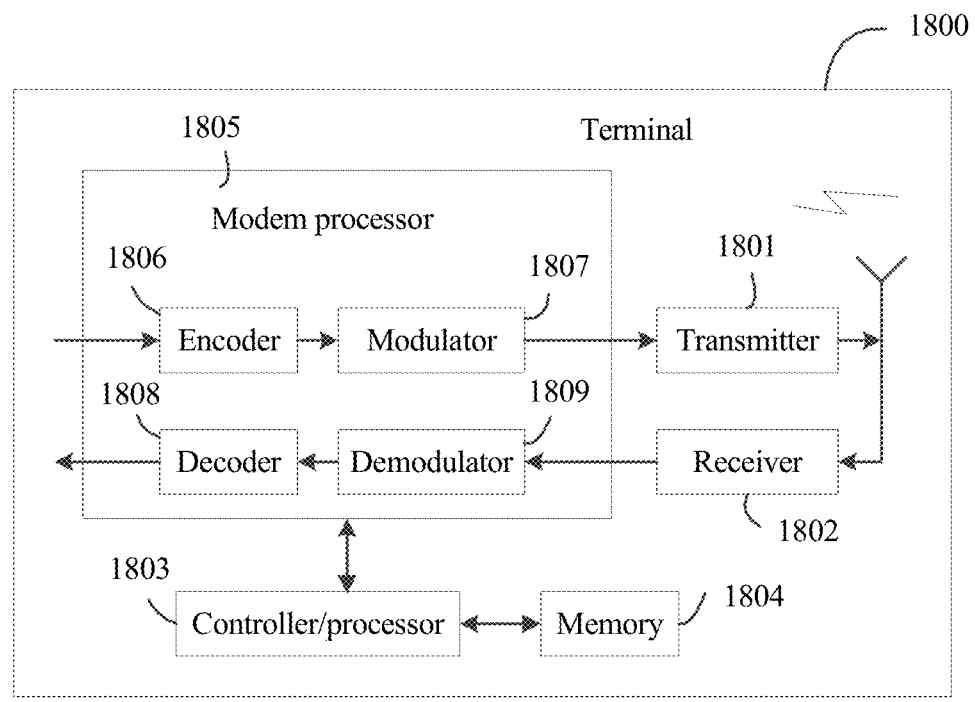
FIG. 18 is a possible schematic structural diagram of a terminal according to an embodiment of the present disclosure.

FIG. 18 is a simplified schematic diagram of a possible design structure of a terminal according to an embodiment of the present disclosure. A terminal 1800 includes a transmitter 1801, a receiver 1802, and a processor 1803. The processor 1803 and both the transmitter 1801 and the receiver 1802 may communicate with each other by using a bus. The transmitter 1801 sends a signal under the control of the processor 1803, and the receiver 1802 receives a signal under the control of the processor 1803. The processor 1803 may be a controller, and is represented as "a controller/processor 1803" in FIG. 18. Optionally, the terminal 1800 may further include a modem processor 1805, and the modem processor 1805 may include an encoder 1806, a modulator 1807, a decoder 1808, and a demodulator 1809.

In an example, the transmitter 1801 adjusts (for example, performs analog conversion, filtering, amplification, and up-conversion on) output sample, and generates an uplink signal or a D2D communication link signal. The uplink or D2D link signal is transmitted to the network device or a peer terminal in the foregoing embodiments by using an antenna. On a downlink or a D2D communication link, the antenna receives a downlink or D2D communication link signal transmitted by the network device or the peer terminal in the foregoing embodiments. The receiver 1802 adjusts (for example, performs filtering, amplification, down-conversion, and digitization on) the signal received from the antenna, and provides an input sample. In the modem processor 1805, the encoder 1806 receives service data and a signaling message that are to be sent on the uplink or the D2D communication link, and processes (for example, formats, encodes, and interleaves) the service data and the signaling message. The modulator 1807 further processes (for example, performs symbol mapping and modulation on) encoded service data and an encoded signaling message, and provides an output sample. The demodulator 1809 processes (for example, demodulates) the input sample and provides symbol estimation. The decoder 1808 processes (for example, de-interleaves and decodes) the symbol estimation and provides decoded data and a decoded signaling message that are to be sent to the terminal 1800. The encoder 1806, the modulator 1807, the demodulator 1809, and the decoder 1808 may be implemented by using the combined modem processor 1805. These units perform processing based on a radio access technology (for example, access technologies of LTE and another evolved system) used by a radio access network. It should be noted that, when the terminal 1800 does not include the modem processor 1805, the foregoing functions of the modem processor 1805 may be implemented by the processor 1803.

The processor 1803 controls and manages an action of the terminal 1800, and is configured to perform a processing process performed by the terminal 1800 in the embodiments of the present disclosure. For example, when the terminal 1800 is the first terminal in the foregoing embodiments, the processor 1803 is further configured to perform the steps on the first terminal side in the method embodiments, and/or other steps in the technical solutions described in this application. For another example, when the terminal 1800 is the second terminal in the foregoing embodiments, the processor 1803 is further configured to perform the steps on the second terminal side in the method embodiments, and/or other steps in the technical solutions described in this application.

Further, the terminal 1800 may further include a memory 1804, and the memory 1804 is configured to store program code and data of the terminal 1800.

The processor configured to perform functions of the network device or the terminal in the embodiments of the present disclosure may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in the embodiments of the present disclosure. The processor may be a combination that implements a computing function, for example, a combination of one or more microprocessors, or a combination of a DSP and a microprocessor.

Methods or algorithm steps described with reference to the content disclosed in the embodiments of the present disclosure may be implemented by hardware, or may be implemented by a processor by executing a software instruction. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. A storage medium used as an example is coupled to the processor, so that the processor can read information from the storage medium and can write information into the storage medium. Certainly, the storage medium may be a component of the processor. The processor and the storage medium may be located in an ASIC. In addition, the ASIC may be located in the network device or the terminal. Certainly, the processor and the storage medium may exist in the network device or the terminal as discrete components.

A person skilled in the art should be aware that in the foregoing one or more examples, functions described in the embodiments of the present disclosure may be implemented by hardware, software, firmware, or any combination thereof. When the functions are implemented by software, the functions may be stored in a computer readable medium or transmitted as one or more instructions or code in the computer readable medium. The computer readable medium includes a computer storage medium and a communications medium. The communications medium includes any medium that enables a computer program to be transmitted from one place to another. The storage medium may be any available medium that can be accessed by a general-purpose or dedicated computer.

In the foregoing specific implementations, the objectives, technical solutions, and beneficial effects of the embodiments of the present disclosure are further described in detail. It should be understood that the foregoing descriptions are merely specific implementations of the embodiments of the present disclosure, but are not intended to limit the protection scope of the embodiments of present disclosure. Any modification, equivalent replacement, or improvement made based on the technical solutions in the embodiments of the present disclosure shall fall within the protection scope of the embodiments of the present disclosure.

What is claimed is:

1. A device, comprising:
   a processor; and
   a non-transitory memory, wherein the memory stores execution instructions which, when executed by the processor, enable the device to:
   receive power control information for controlling a transmit power to be used by the device when the device communicates with a second terminal and a first communication link is established between the device and the second terminal, wherein the power control information comprises an expected receive power value, and the expected receive power value is a power value of a signal that is sent by the device on the first communication link and that the second terminal or a network device expects to receive,
   determine a target transmit power based on the power control information, and
   send first data to the second terminal based on the target transmit power.

2. The device according to claim 1, wherein the execution instructions, when executed by the processor, further enable the device to:
   receive the power control information sent by the second terminal.

3. The device according to claim 1, wherein the execution instructions, when executed by the processor, further enable the device to:
   receive the power control information sent by the network device.

4. A network device, comprising:
   a processor; and
   a non-transitory memory, wherein the memory stores execution instructions which, when executed by the processor, enable the network device to:
   determine power control information for controlling a transmit power to be used by a first terminal when the first terminal communicates with a second terminal and a first communication link is established between the first terminal and the second terminal, wherein the power control information comprises or is determined using an expected receive power value, and the expected receive power value is a power value of a signal that is sent by the first terminal on the first communication link and that the second terminal or the network device expects to receive, and
   send the power control information to the first terminal; and
   wherein the network device is a network-side device.

5. A device, comprising:
   a processor; and
   a non-transitory memory, wherein the memory stores execution instructions which, when executed by the processor, enable the device to:
   receive an expected receive power value from a network device, wherein the expected receive power value is a expected receive power value of a signal that is sent by the device on a first communication link between the device and a first terminal and that the device or a network device expects to receive,
   determine, using the receive power value, power control information for controlling a transmit power used by a first terminal when the first terminal communicates with the device and the first communication link is established between the first terminal and the device,
   send the power control information to the first terminal, and
   receive first data that is sent by the first terminal based on a target transmit power.

* * * * *